US012464337B2

(12) United States Patent
Ericson et al.

(10) Patent No.: US 12,464,337 B2
(45) Date of Patent: Nov. 4, 2025

(54) APPARATUSES AND METHODS FOR REGISTERING A GROUP OF USER EQUIPMENT

(71) Applicant: Telefonaktiebolaget LM Ericsson (publ), Stockholm (SE)

(72) Inventors: Mårten Ericson, Gammelstad (SE); Min Wang, Luleå (SE); Jan Christoffersson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 726 days.

(21) Appl. No.: 17/767,737

(22) PCT Filed: Oct. 11, 2019

(86) PCT No.: PCT/SE2019/050995
§ 371 (c)(1),
(2) Date: Apr. 8, 2022

(87) PCT Pub. No.: WO2021/071402
PCT Pub. Date: Apr. 15, 2021

(65) Prior Publication Data
US 2023/0103917 A1    Apr. 6, 2023

(51) Int. Cl.
*H04W 8/18* (2009.01)
*H04W 4/08* (2009.01)
(Continued)

(52) U.S. Cl.
CPC ............. *H04W 8/186* (2013.01); *H04W 4/08* (2013.01); *H04W 12/76* (2021.01); *H04W 60/00* (2013.01); *H04W 12/06* (2013.01)

(58) Field of Classification Search
CPC .......... H04W 56/0015; H04W 72/121; H04W 72/20; H04W 72/25; H04W 88/04;
(Continued)

(56) References Cited

U.S. PATENT DOCUMENTS 9,485,751 B2 * 11/2016 Hayashi ................ H04W 72/30
9,504,090 B2 * 11/2016 Lee ........................ H04W 76/14
(Continued)

FOREIGN PATENT DOCUMENTS

EP     3 229 549 B1     11/2018
WO    2017/105534 A1    6/2017
WO    2018/202797 A1   11/2018

OTHER PUBLICATIONS

International Search Report and Written Opinion dated Sep. 16, 2020 in International Application No. PCT/SE2019/050995 (12 pages).
(Continued)

*Primary Examiner* — Brendan Y Higa
(74) *Attorney, Agent, or Firm* — Rothwell, Figg, Ernst & Manbeck, P.C.

(57) ABSTRACT

The present disclosure relates to telecommunications. In one of its aspects, the disclosure concerns a method in a coordinator User Equipment (UE) for registering a group of UEs to a wireless communications system. The coordinator UE represents the group of UEs. The method comprises transmitting, to a Radio Access Network (RAN) node, a message comprising a group IDentity (ID) to initiate an authentication and security procedure to register the group of UEs to the wireless communications system. The group ID identifies the group of UEs.

17 Claims, 14 Drawing Sheets

(51) Int. Cl.
*H04W 12/06* (2021.01)
*H04W 12/76* (2021.01)
*H04W 60/00* (2009.01)

(58) Field of Classification Search
CPC ....... H04W 4/08; H04W 8/186; H04W 12/76; H04W 36/0009; H04W 60/00–06
See application file for complete search history.

(56) References Cited

U.S. PATENT DOCUMENTS

| | | | | |
|---|---|---|---|---|
| 10,299,160 | B2* | 5/2019 | Huang | H04W 8/04 |
| 10,321,358 | B2* | 6/2019 | Kim | H04L 61/00 |
| 10,356,610 | B2* | 7/2019 | Xu | H04W 8/26 |
| 10,701,549 | B2* | 6/2020 | Basu Mallick | H04W 4/023 |
| 10,897,784 | B2* | 1/2021 | Muraoka | H04W 88/085 |
| 11,785,566 | B2* | 10/2023 | Yeo | H04W 56/002 370/312 |
| 2013/0250838 | A1* | 9/2013 | Liang | H04W 4/08 370/312 |
| 2014/0003320 | A1* | 1/2014 | Etemad | H04W 4/08 370/312 |
| 2014/0098731 | A1* | 4/2014 | Maaref | H04W 76/40 370/312 |
| 2014/0344441 | A1* | 11/2014 | Janakiraman | H04L 41/0654 709/224 |
| 2016/0352445 | A1* | 12/2016 | Wu | H04W 4/70 |
| 2016/0353337 | A1* | 12/2016 | Zhu | H04W 4/08 |
| 2017/0265018 | A1* | 9/2017 | Mok | H04W 4/90 |
| 2018/0115980 | A1* | 4/2018 | Pajukoski | H04W 72/30 |
| 2018/0139651 | A1* | 5/2018 | Kim | H04L 5/00 |
| 2018/0368196 | A1 | 12/2018 | Gage | |
| 2019/0159018 | A1* | 5/2019 | Basu Mallick | H04W 8/005 |
| 2019/0191467 | A1 | 6/2019 | Dao et al. | |
| 2019/0238345 | A1 | 8/2019 | Gage | |
| 2019/0306746 | A1* | 10/2019 | Sunagawa | H04W 36/10 |
| 2019/0387401 | A1* | 12/2019 | Liao | H04W 4/08 |
| 2019/0394201 | A1* | 12/2019 | Zhang | H04L 67/10 |
| 2020/0059761 | A1* | 2/2020 | Li | H04W 4/24 |
| 2020/0351872 | A1* | 11/2020 | Cai | H04W 72/23 |
| 2021/0068135 | A1* | 3/2021 | Shah | H04W 72/121 |
| 2022/0377534 | A1* | 11/2022 | Ericson | H04W 8/26 |
| 2022/0407846 | A1* | 12/2022 | Zhang | H04L 63/065 |

OTHER PUBLICATIONS

Jung, Y. et al., "Scalable group-based machine-to-machine communications in LTE-advanced networks", Jun. 13, 2017, Wireless Networks, 25, pp. 63-74, https://doi.org/10.1007/s11276-017-1541-y (12 pages).

Jung, S. et al., "A new way of extending network coverage: Relay-assisted D2D communications in 3GPP", 2016, ICT Express 2, pp. 117-121, www.elsevier.com/locate/icte (5 pages).

Elmenreich, W., et al., "Building Blocks of Cooperative Relaying in Wireless Systems", Aug. 14, 2008, Springer e&i Journal, 125(10), pp. 353-359 (9 pages).

* cited by examiner

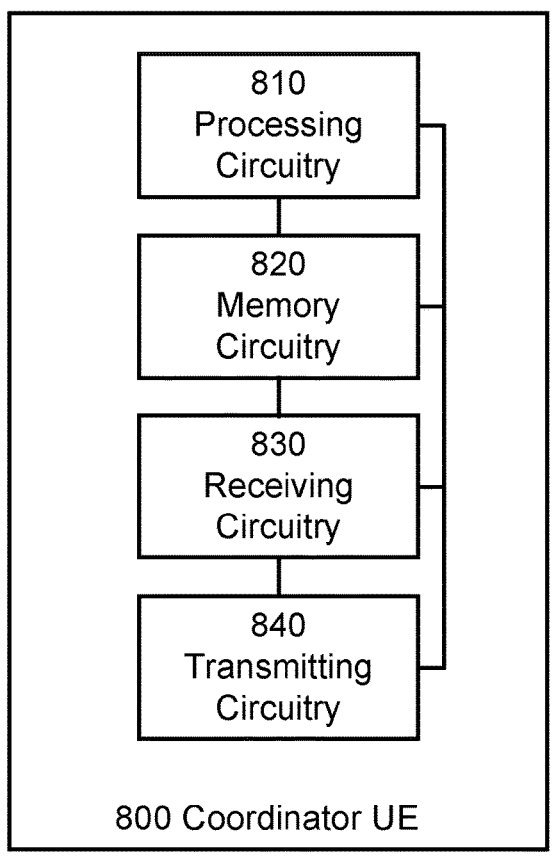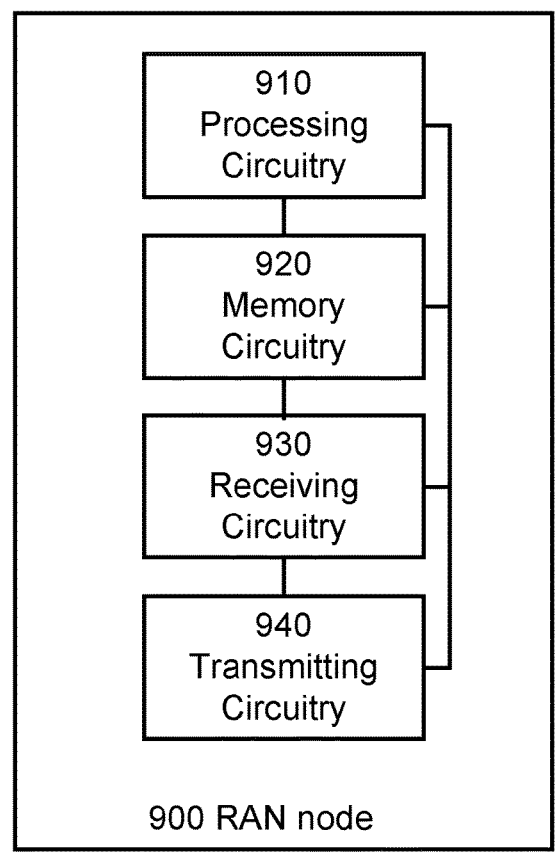
Fig. 8                        Fig. 9

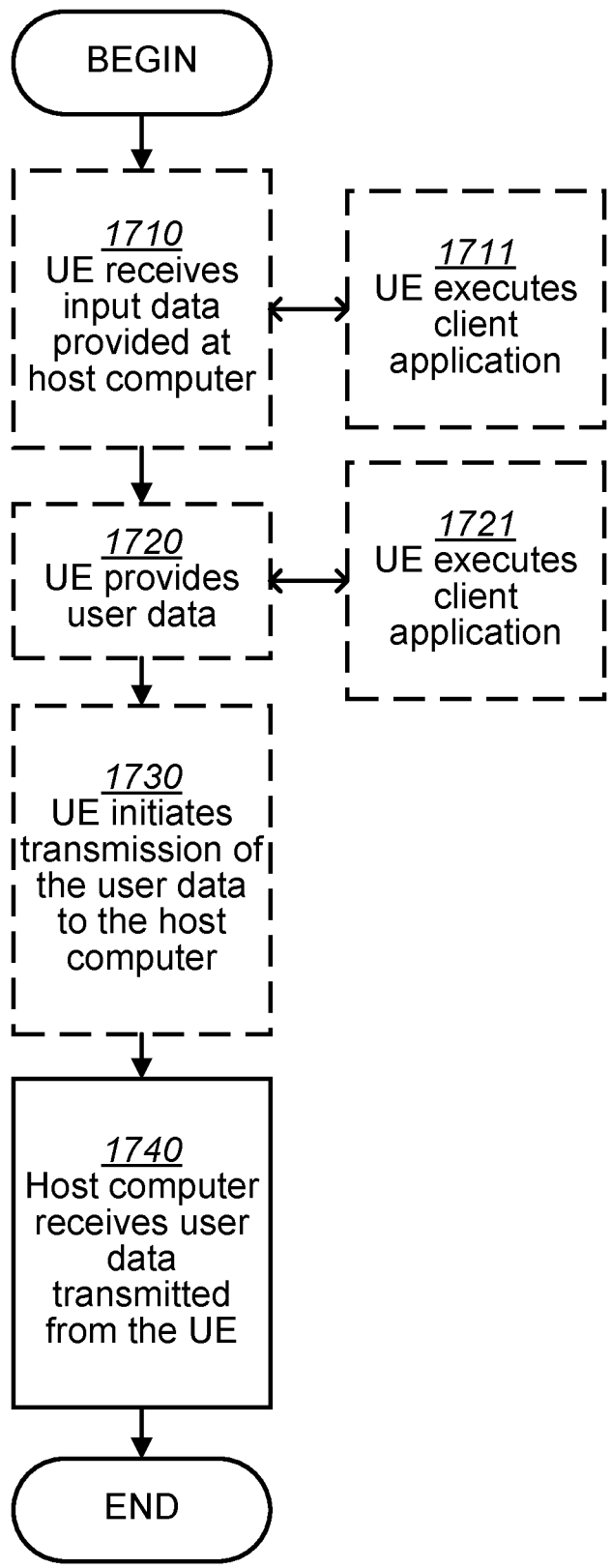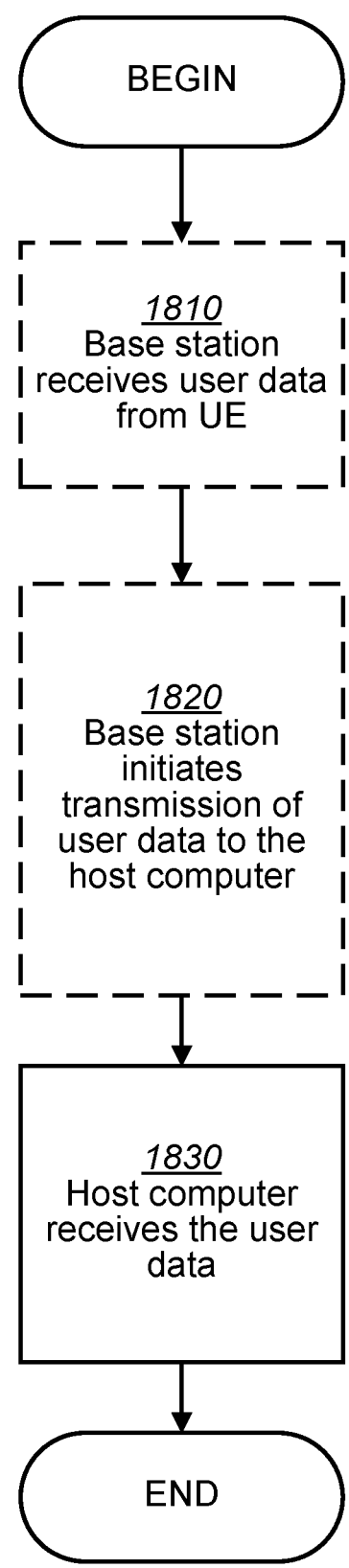
Fig. 17
Fig. 18

APPARATUSES AND METHODS FOR REGISTERING A GROUP OF USER EQUIPMENT

CROSS REFERENCE TO RELATED APPLICATION(S)

This application is a 35 U.S.C. § 371 National Stage of International Patent Application No. PCT/SE2019/050995, filed Oct. 11, 2019.

TECHNICAL FIELD

The present disclosure generally relates to telecommunications. In particular, the various embodiments described in this disclosure relate to apparatuses and methods for registering a group of User Equipment (UEs) to a wireless communications system.

BACKGROUND

This section is intended to provide a background to the various embodiments of the invention that are described in this disclosure. Therefore, unless otherwise indicated herein, what is described in this section should not be interpreted to be prior art by its mere inclusion in this section.

To receive service from a network, a User Equipment (UE) has to perform an attach procedure to the network, i.e. register itself to the network. To register itself to the network, the UE has to be associated with an Identity (ID), such that the network may differentiate between different UEs.

An International Mobile Subscriber Identity (IMSI) is a number that uniquely identifies every UE of a cellular network. However, due to security reasons the IMSI should not be transmitted in the network if it can be avoided. Therefore, several temporary identities for the UEs are used.

A Temporary Mobile Subscriber Identity (TMSI) is one temporary ID. It is, in a very simplified view, used to identify the UE with the Mobile Management Entity (MME). A Globally Unique Temporary Identifier (GUTI) consist of the TMSI and an ID called GUMMEI, which is an abbreviation for Globally Unique Mobility Management Entity Identifier. The GUMMEI uniquely identifies the MME that has allocated the GUTI. The UE uses the GUTI to identify to which MME a re-establish request should be sent. If the UE has moved from a Universal Mobile Telecommunications System (UMTS) cell to a Long Term Evolution (LTE) cell, the UE does not have its GUTI and a Tracking Area Update procedure is performed. A Packet TMSI (P-TMSI) is sent. In accordance with this, the MME, which is in control of the area to which the UE moved, can contact a Serving GPRS (General Packet Radio Service) Support Node (SGSN), which is in control of the area where the UE previously was, to request the current profile, e.g. IP address and default bearers. The situation is similar when a UE has moved from an LTE to a UMTS cell. The GUTI is sent as the P-TMSI parameter and the procedure is referred as Routing Area Update (RAU).

Other examples of identifiers are Radio Network Temporary Identifiers (RNTIs). Example of such IDs are Cell-RNTI (C-RNTI), Temporary C-RNTI (TC-RNTI) and Random Access RNTI (RA-RNTI). The RNTIs are temporary identifiers for the UE when it communicates with the Radio Access Network (RAN), i.e. the Base Station (BS).

As previously described, the UE has to perform an attach procedure to the network to receive services from the network. However, before that, the UE has to make a first random access; such process is illustrated in FIG. 1. The Random Access CHannel (RACH) is designed to achieve uplink time synchronization for a UE that has not yet acquired or has lost its uplink synchronization.

When a UE attempts to establish a radio link, it selects a RACH preamble randomly and requests a random access to the BS, e.g. an eNB or a gNB. Thus, the first message (Msg1) transmitted by the UE to the BS is a RACH preamble, illustrated as step 11 in FIG. 1. Another UE may have selected the same RACH preamble and therefore there is a risk of collision, i.e. contention-based RACH. In case of collision, the UE that loses the contention will have to re-initiate the random access with reselected preambles. The RACH access gives an identity of the UE to the network so that the network can address the UE in a next step. The identity, which the UE will use, is the RA-RNTI. The RA-RNTI is determined from the time slot number in which the preamble is sent. If the UE does not receive any response from the network within a given time window, it will ramp up its power and send another RACH preamble.

The BS responds with a Random Access Response (RAR) to the UE on a DownLink Shared CHannel (DL-SCH) addressed to the RA-RNTI, illustrated as step 12, Msg2, in FIG. 1. The response is calculated from the timeslot in which the preamble was sent. The response message carries a TC-RNTI, a timing advance value and an uplink grant resource for the next Radio Resource Control (RRC) signalling message. The BS informs the UE to adjust its timing by the timing advance value to compensate for the propagation delay caused by UE distance from the BS. The network, i.e. the BS, assigns initial resources and uplink grant resources to the UE so that the UE can use an UpLink Shared CHannel (UL-SCH) to transmit an RRC connection request message in a next step.

In step 13, the UE sends the RRC connection request message (Msg3) to the BS using the UL-SCH. The UE is identified by the TC-RNTI, which was received in the RAR message in step 12. The message further contains a UE identity, i.e. a TMSI or a random value, and a connection establishment cause value, which indicates the purpose of the UE to request the setup of the RRC connection.

A TMSI is used if the UE previously has connected to the same network. With the TMSI value, the UE is identified in the core network. A random value is used if the UE is connecting to the network for the first time. The random value, or the TMSI, helps to distinguish between UEs when the same TC-RNTI has been assigned to more than one UE, i.e. when a collision has occurred.

Thereafter, if the RRC Connection request was successfully received, the BS responds with a contention resolution message to the identified UE, step 14 (Msg4) in FIG. 1. A corresponding Physical Downlink Control CHannel (PDCCH) transmission is addressed to the TC-RNTI, which has been assigned to UE in the RACH response. The UE identity, i.e. the TMSI or the random value, is also included in the message's Medium Access Control (MAC) Control Element (CE), indicating the success of contention resolution. The TC-RNTI is promoted to C-RNTI, which will be used by the UE for further communication.

After the random access procedure has been performed, a registration procedure, called an attach procedure in LTE, is started. A simplified signalling diagram for this procedure is illustrated in FIG. 1. The registration procedure is performed in order for the UE to receive services from the network, i.e. to set-up a UE context and configure the bearers such that the UE can connect to the internet, or to make a phone or video call. The registration procedure is typically only performed when the UE is turned on.

The MME in LTE Core Network (called Evolved Packet Core (EPC)), or the corresponding function in the New Radio (NR) Core Network (5GC) (called the Access and Mobility management Function (AMF)), creates a UE context when a UE is turned on and registers to the network, i.e. the wireless communications system. It assigns a unique short temporary identity, a SAE-Temporary Mobile Subscriber Identity (S-TMSI), to the UE. The identity identifies the UE context in the AMF, or in the MME. The UE context holds user subscription information downloaded from the Home Subscriber Server (HSS).

When a UE makes a registration to the network a mutual authentication of the UE and the network is performed between the UE and the AMF/HSS, or MME/HSS in LTE. This authentication function also establishes the security keys that are used for encryption of the bearers.

The registration procedure in NR is very similar to the attach procedure in LTE, except that the attach procedure and bearer setups are separated. This split is done because the "registration" to the network is done by the AMF and a Session Management Function (SMF) does the session management, such as bearer setup.

SUMMARY

By using Device-to-Device (D2D) group communication, uplink coverage and user bit rate may be increased, for example in a high frequency 5G, or New Radio (NR), network. Transmission reliability for UEs in bad coverage may be improved. When a UE has data to transmit, it may first distribute this data to neighbouring UEs over D2D or SideLink (SL). The neighbouring UEs may be assigned to a group, into which also the UE that has data to transmit is included. In a second step, the UEs in the group may cooperatively transmit the data over a cellular UpLink (UL) to a Base Station (BS) node. The cooperative transmission may increase the UL coverage e.g. by combining several UEs total output power and may be beneficial from a latency point of view compared to repeated transmissions for coverage, as used e.g. in Long Term Evolution (LTE) narrowband.

A 2-hop group transmission concept, i.e. where data first is transmitted over SL to the group and thereafter cooperatively transmitted over cellular UL, is illustrated in FIGS. 2a and 2b. FIGS. 2a and 2b show a UE in a group that wants to transmit data through the group. FIG. 2a illustrates the first step, i.e. the 1st hop, where the UE sends its data over the SL to the other UEs in the group. FIG. 2b illustrates the second step, i.e. the 2nd hop, where the data is sent in a synchronized manner from the UEs in the group over the cellular UL to a network node or BS, e.g. an eNB or a gNB. In DownLink (DL), the network may transmit data to the group as if the group was a single UE. At least one UE in the group must be able to receive the DL data, and if necessary, the DL data may be relayed to the other UEs in the group via D2D. This technique is also known as cooperative relaying or Virtual Antenna Array.

Proximity-based Services (ProSe) is one example of technology that may be used to transmit data within a group of UEs. ProSe is a D2D technology that allows LTE UEs to detect each other and to communicate directly. In ProSe, SLs are used. As previously described, by using SL relaying, network coverage for a UE may be extended. If an UE is out of coverage, the UE may be connected to another UE closer to the BS, which is in coverage. The remote UE may then use SL to relay data to the closer UE, which forwards the data to the BS.

A User Plane (UP) protocol for SL relay is illustrated in FIG. 3. As shown in the figure, the relay UE has two radio interfaces to the BS, i.e. the eNB, and to the remote UE, respectively. The relay UE may use the PC5-U interface to transmit data to the remote UE, and the relay UE may use the Uu interface to transmit data to the eNB. It relays IP packets between the remote UE and the network at the IP layer.

To identify a transmitting UE and a ProSe group for which the data packet is intended, two identities are provided in each message. These are ProSe UE ID and ProSe Layer-2 Group ID. These IDs either are provided by the network or preconfigured in the UE. The ProSe UE ID is a group member ID and has a length of 24 bits. It is used in each MAC PDU as a source. The ProSe Layer-2 Group ID is used to identify the group and has a length of 24 bit. Together with the logical channel ID, the ProSe UE ID and the ProSe Layer-2 Group ID identify the Packet Data Convergence Protocol (PDCP)/Radio Link Control (RLC) pair to be used in the receiving UE. One UE generally has different Group Member IDs in different groups.

The header of the sidelink shared channel is illustrated in FIG. 4. The transmitting UE is the source and associated with field 42. The receiver is the destination and associated with field 43 in FIG. 4. Field 41, named V, is the version number. The bits named R in the fields 44 are reserved bits and may be used for later releases. The Source field 42 is identical to the ProSe UE ID and has a length of 24 bits. The Destination field 43 is identical to the ProSe Layer-2 Group ID and indicates the receiver group. Using the Destination field 43, the UE can drop data packets at the MAC layer.

The existing Proximity-based Services (ProSe) concept, i.e. LTE Device-to-Device (D2D), has some limitations. It cannot support 2-hop cooperative group transmission because it cannot handle the identities of the group of UEs performing the 2-hop group transmission. It is not possible to register the group of UEs to the network, e.g. the wireless communications system. The ProSe Layer-2 Group ID can be used for internal D2D group communication, but it cannot be used for cellular group communication since the group is not attached, or registered, to the network. The ProSe Layer-2 Group ID does not have an active context for the ProSe group at the BS and consequently there are no bearers associated to the group, i.e. there are no bearers for the transmission to the eNB and no bearers for the Core Network transport either. Furthermore, the existing sidelink relaying framework, as previously described, is designed for point-to-point communication and thus, cannot be used for point-to-multipoint communication. Accordingly, there is a need for a way of register a group of UEs to a network.

It is in view of the above background and other considerations that the various embodiments of the present disclosure have been made.

It is proposed to provide a solution to address this problem, i.e. providing a registration process for registering a group of UEs to a network, i.e. a wireless communications system.

This general object has been addressed by the appended independent claims. Advantageous embodiments are defined in the appended dependent claims.

According to a first aspect, there is provided a method in a coordinator UE for registering a group of UEs to a wireless communications system. The coordinator UE represents the group of UEs.

The method comprises transmitting, to a Radio Access Network (RAN) node, a message comprising a group IDentity (ID) to initiate an authentication and security procedure to register the group of UEs to the wireless communications system. The group ID identifies the group of UEs.

In some embodiments, the method further comprises transmitting, to the RAN node, a connection request message comprising an indicator identifying a group registration request. The method further comprises receiving, from the RAN node, if the coordinator UE is allowed to register a group, a response message comprising a group ID. The method may further comprise assigning at least one UE to the group by associating the at least one UE with the group ID.

In some embodiments, the method further comprises transmitting, to the RAN node, a connection request message comprising the group ID to indicate that radio access is triggered for the group of UEs. The method further comprises receiving, from the RAN node, if the connection request was successfully received, a response message comprising a temporary group identity. The temporary group identity is a temporary identity to be used by the group when communicating with the RAN node. The method may further comprise broadcasting the received temporary group identity to the UEs assigned to the group. The temporary group identity may be, for example, a C-RNTI.

In some embodiments, if the coordinator UE is not registered to the wireless communications system, the transmitted connection request message further comprises a UE identity identifying the coordinator UE.

In some embodiments, if the authentication and security procedure is successfully performed, a context for the group of UEs in the Core Network (CN) is set up.

According to a second aspect, there is provided a method in a RAN node for registering a group of UEs to a wireless communications system. A coordinator UE represents the group of UEs.

The method comprises receiving, from the coordinator UE, a message comprising a group ID, to initiate an authentication and security procedure to register the group of UEs to the wireless communications system. The group ID identifies the group of UEs.

In some embodiments, the method further comprises transmitting, to a CN node, the received message comprising the group ID to initiate the authentication and security procedure to register the group of UEs to the wireless communications system. If the authentication and security procedure is successfully performed, the method may further comprise setting up a context for the group of UEs in the CN network. The method may further comprise receiving, from the CN node, a registration accept message comprising at least one uplink group Tunnel Endpoint Identifier (TEID) to be used for sending uplink data. The method may further comprise transmitting, to the CN node, a response comprising at least one downlink group TEID to be used for sending uplink data.

In some embodiments, the method further comprises receiving, from the coordinator UE, a connection request message comprising an indicator identifying a group registration request and determining if the coordinator UE is allowed to register a group. If the coordinator UE is allowed to register a group, the method further comprises transmitting, to the coordinator UE, a response message comprising the group ID.

In some embodiments, the method further comprises receiving, from the coordinator UE, a connection request message comprising the group ID to indicate that radio access is triggered for the group. The method further comprises transmitting, to the coordinator UE, if the connection request was successfully received, a response message comprising a temporary group identity. The temporary group identity is a temporary identity to be used by the group when communicating with the RAN node. The temporary group identity may be a C-RNTI.

In some embodiments, if the coordinator UE is not registered to the wireless communications system, the received connection request message further comprises a UE identity identifying the coordinator UE.

According to a third aspect, there is provided a coordinator UE configured to perform the method according to the first aspect.

The coordinator UE is configured for registering a group of UEs to a wireless communications system. The coordinator UE represents the group of UEs. The coordinator UE comprises a processing circuitry and a memory circuitry. The memory circuit stores computer program code which, when run in the processing circuitry, causes the coordinator UE to transmit, to a RAN node, a message comprising a group ID to initiate an authentication and security procedure to register the group of UEs with to the wireless communications system. The group ID identifies the group of UEs.

In some embodiments, the memory circuitry storing computer program code which, when run in the processing circuitry, further causes the coordinator UE to transmit, to the RAN node, a connection request message comprising an indicator identifying a group registration request. The coordinator UE is further caused to receive, from the RAN node, if the coordinator UE is allowed to register a group, a response message comprising a group ID.

In some embodiments, the memory circuitry storing computer program code which, when run in the processing circuitry, further causes the coordinator UE to assign at least one UE to the group by associating the at least one UE with the group ID.

In some embodiments, the memory circuitry storing computer program code which, when run in the processing circuitry, further causes the coordinator UE to transmit, to the RAN node, a connection request message comprising the group ID to indicate that radio access is triggered for the group of UEs. The coordinator UE is further caused to receive, from the RAN node, if the connection request was successfully received, a response message comprising a temporary group identity. The temporary group identity is a temporary identity to be used by the group when communicating with the RAN node. The memory circuitry storing computer program code which, when run in the processing circuitry, may further cause the coordinator UE to broadcast the received temporary group identity to the UEs assigned to the group. The temporary group identity may be, for example, a C-RNTI.

In some embodiments, if the coordinator UE is not registered to the wireless communications system, the transmitted connection request message further comprises an UE identity identifying the coordinator UE.

In some embodiments, if the authentication and security procedure is successfully performed, a context for the group of UEs in the CN is set up.

According to a fourth aspect, there is provided a RAN node configured to perform the method according to the second aspect.

The RAN node is configured for registering a group of UEs to a wireless communications system. A coordinator UE represents the group of UEs. The RAN node comprises a processing circuitry and a memory circuitry. The memory circuit stores computer program code which, when run in the processing circuitry, causes the RAN node to receive, from the coordinator UE, a message comprising a group ID to initiate an authentication and security procedure to register the group of UEs to the wireless communications network. The group ID identifies the group UEs.

In some embodiments, the memory circuitry storing computer program code which, when run in the processing circuitry, further causes the RAN node to transmit, to a CN node, the received message comprising the group ID to initiate the authentication and security procedure to register the group of UEs to the wireless communications system.

In some embodiments, if the authentication and security procedure is successfully performed, the memory circuitry storing computer program code which, when run in the processing circuitry, further causes the RAN node to set up a context for the group of UEs in the CN network. The memory circuitry storing computer program code which, when run in the processing circuitry, further causes the RAN node to receive, from the CN node, a registration accept message comprising at least one uplink group TEID to be used for sending uplink data. The RAN node is further caused to transmit, to the CN node, a response comprising at least one downlink group TEID to be used for sending uplink data.

In some embodiments, the memory circuitry storing computer program code which, when run in the processing circuitry, further causes the RAN node to receive, from the coordinator UE, a connection request message comprising an indicator indicating a group registration request. The RAN node is further caused to determine if the coordinator UE is allowed to register a group. If the coordinator UE is allowed to register a group, the RAN node is further caused to transmit, to the coordinator UE, a response message comprising the group ID.

In some embodiments, the memory circuitry storing computer program code which, when run in the processing circuitry, further causes the RAN node to receive, from the coordinator UE, a connection request message comprising the group ID to indicate that radio access is triggered for the group. The RAN node is further caused to transmit, to the coordinator UE, if the connection request was successfully received, a response message comprising a temporary group identity. The temporary group identity is a temporary identity to be used by the group when communicating with the RAN node. The temporary group identity may be a C-RNTI.

In some embodiments, if the coordinator UE is not registered to the wireless communications system, the received connection request message further comprises an UE identity identifying the coordinator UE.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

The various proposed embodiments herein provide a solution for registering a group of UEs to a network.

BRIEF DESCRIPTION OF THE DRAWINGS

These and other aspects, features and advantages will be apparent and elucidated from the following description of various embodiments, reference being made to the accompanying drawings, wherein:

FIG. 8 shows an example implementation of a coordinator UE;

FIG. 9 shows an example implementation of a RAN node;

FIGS. 17 and 18 show example methods implemented in a communication system including a host computer, a base station and a user equipment.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method in a coordinator User Equipment (UE) for registering a group of UEs to a wireless communications system. The coordinator UE represents the group of UEs.

Figure 1:
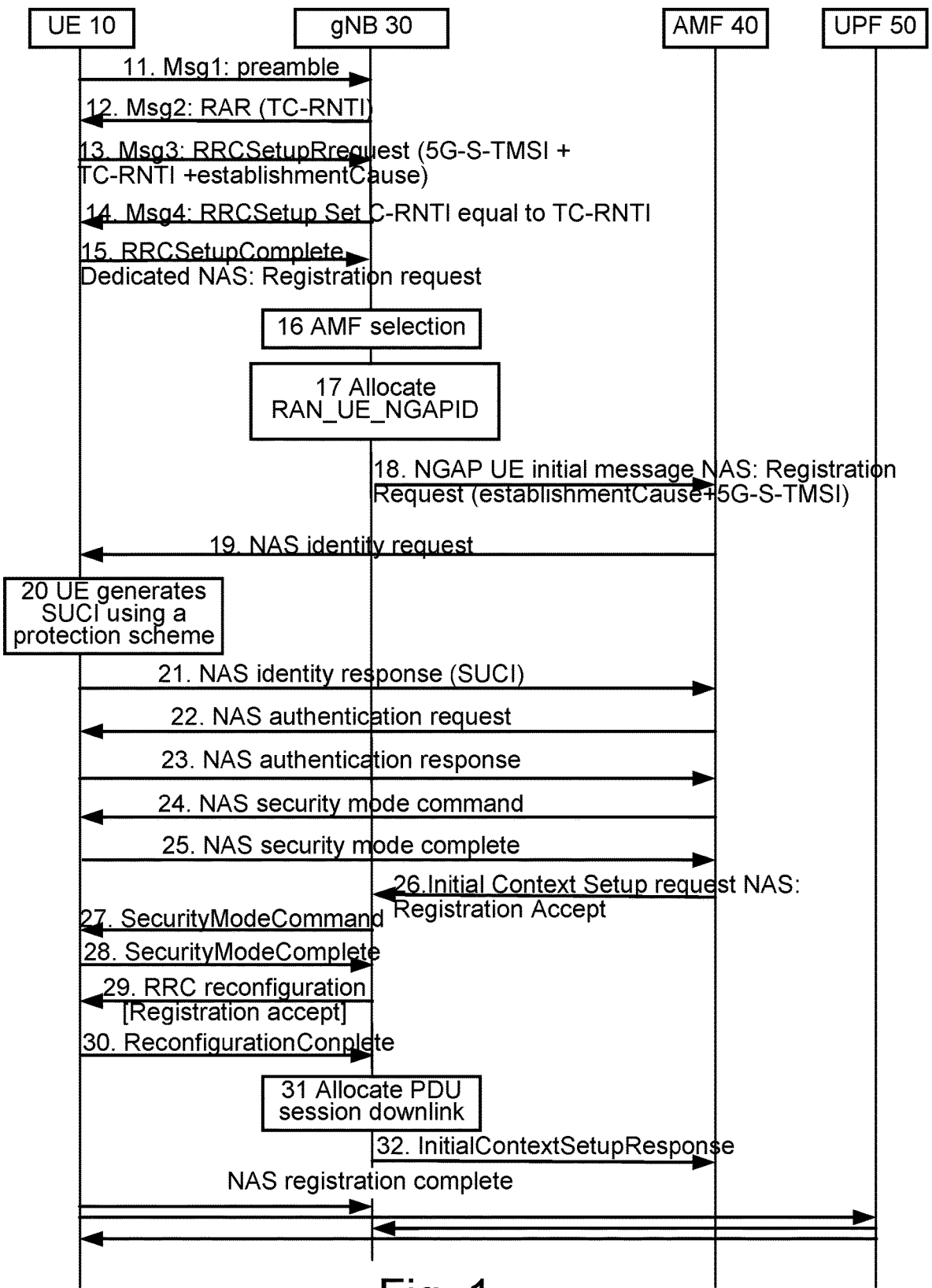
FIG. 1 illustrates a RACH procedure and a registration procedure.
Figure 2A:
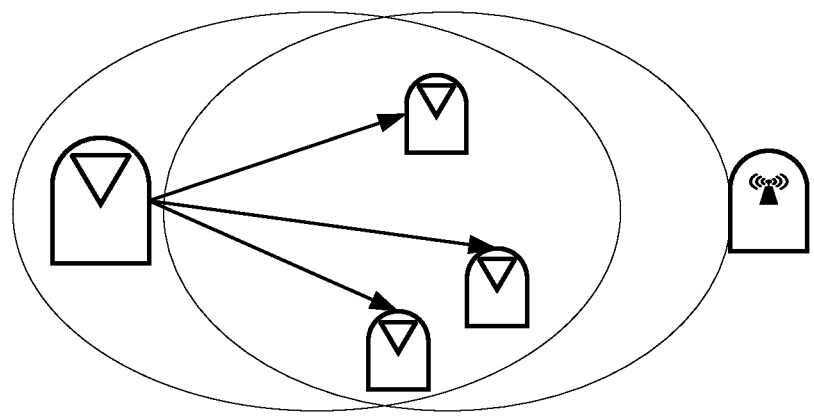
FIGS. 2a and 2b show schematic figures of 2-hop group communication.
Figure 2B:
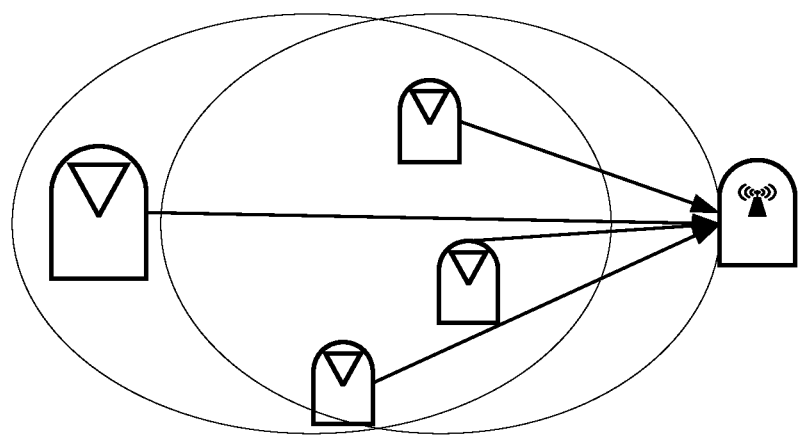
Figure 3:
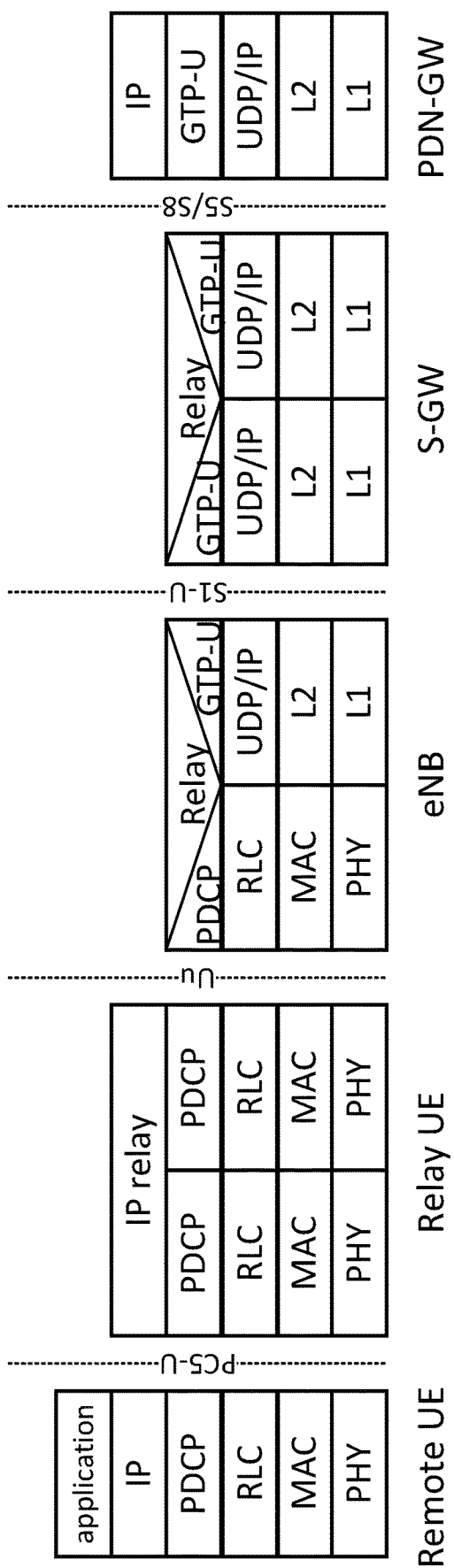
FIG. 3 shows sidelink relaying UP protocol.
Figure 4:
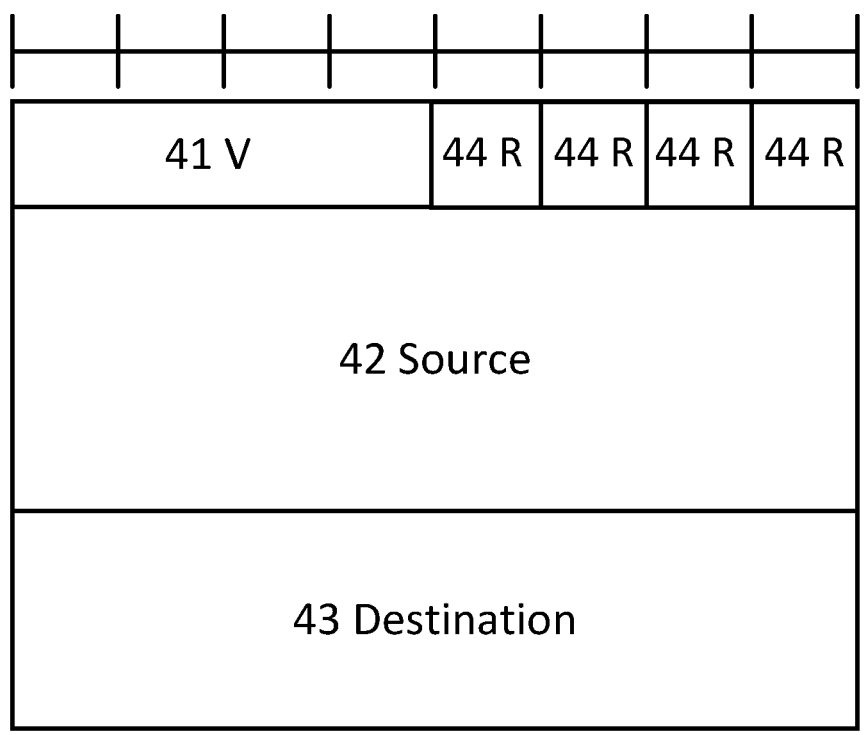
FIG. 4 illustrates an SL-SCH header.
Figure 5A:
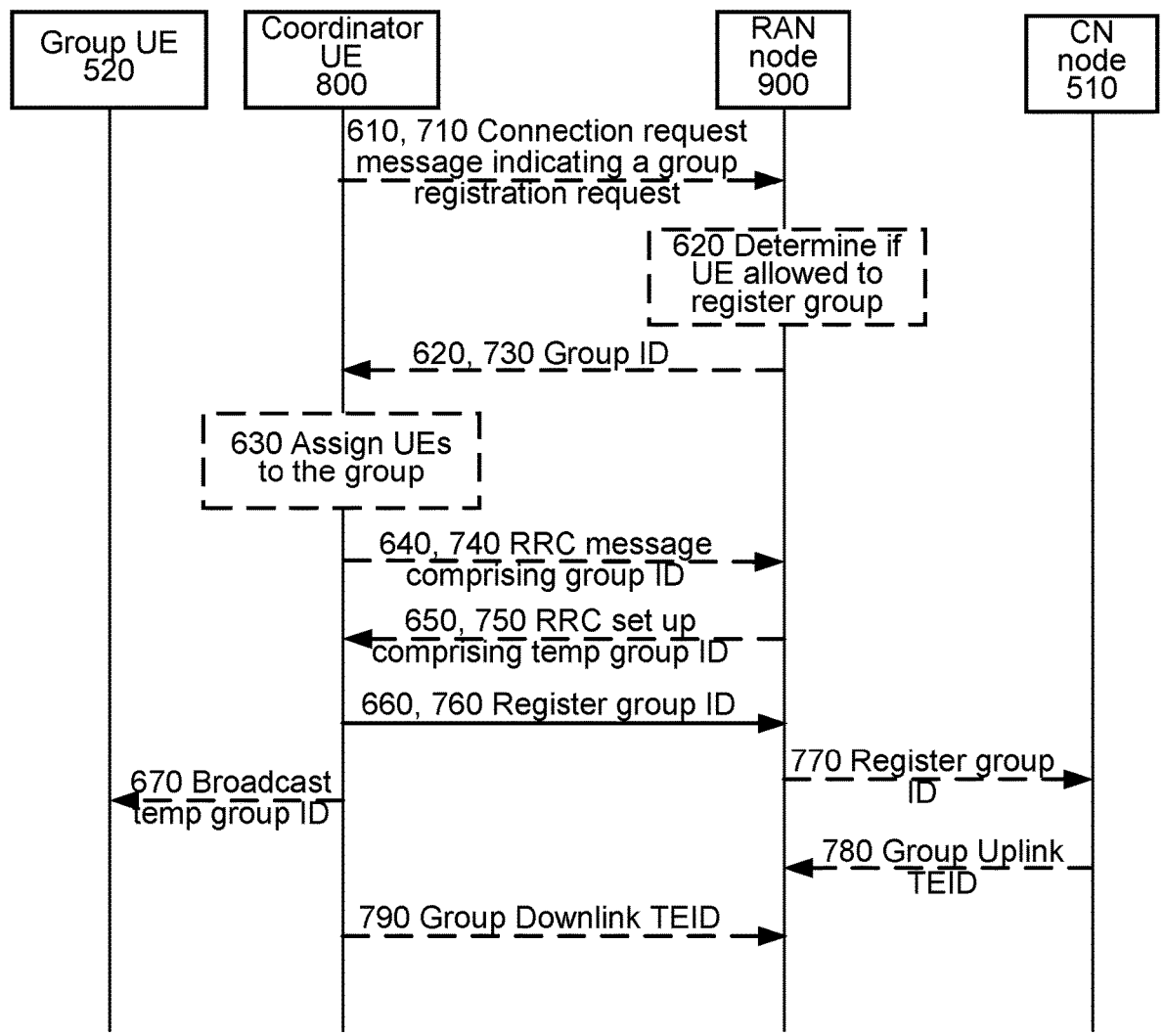
FIG. 5a is a message sequence chart of a process for registering a group of UEs to a wireless communications system.
Figure 6:
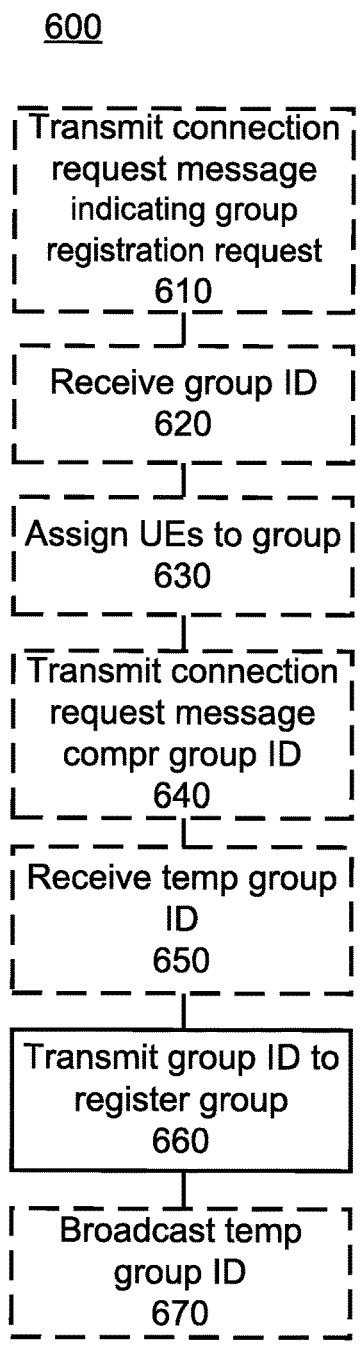
FIG. 6 is a flowchart of an example method performed by a coordinator UE.

With reference to the FIGS. 5a and 6, a first embodiment will now be described. FIG. 5a illustrates a message sequence chart of a process for registering a group of UEs to a wireless communications system, or a network. FIG. 6 illustrates a method 600 in a coordinator UE 800 for registering a group of UEs to a wireless communications system. The coordinator UE 800 represents the group of UEs.

The method 600 comprises step 660 of transmitting, to a Radio Access Network (RAN) node 900, a message comprising a group ID to initiate an authentication and security procedure to register the group of UEs to the wireless communications system. The group ID identifies the group of UEs.

Accordingly, the method 600 according to the present disclosure enables a coordinator UE 800, i.e. the group coordinator, to perform an attach, or registration, procedure for the group of UEs. The coordinator UE 800 informs the RAN node 900 about the ID of the group of UEs that wants to register to the Core Network (CN) such that the group of UEs can receive services from the wireless communications system, i.e. configure bearers. The coordinator UE 800 itself is already registered to the network. Upon triggering of the group creation, the coordinator UE 800 can initiate a registration procedure for the group only. Thus, the proposed method 600 enables a context to be set up for the group of UEs and provides a solution for registering a group of UEs to a network, such that 2-hop group cooperative transmissions can be supported.

In some embodiments, the method 600 may further comprise step 610 of transmitting, to the RAN node 900, a connection request message comprising an indicator identifying a group registration request. The method 600 may further comprise step 620 of receiving, from the RAN node 900, if the coordinator UE 800 is allowed to register a group, a response message comprising a group ID. Accordingly, if no Proximity-based Services (ProSe) group is predefined, no group ID is predefined. In these embodiments, the coordinator UE 800 may add a flag in a message to the RAN node 900 for indicating a group registration request. The message may be, for example, the Msg3, previously described. The wireless communications system may check if this coordinator UE 800 is allowed to register a group, and if so, the wireless communications system may assign a corresponding group ID to the coordinator UE 800. Furthermore, group security keys, which may be used for encryption of the group bearers, may be assigned. According to some embodiments, the method 600 may thereafter further comprise step 630 of assigning at least one UE to the group by associating the at least one UE with the group ID. Thus, the coordinator UE 800 may create a group based on the received group ID.

In some embodiments, the method 600 may further comprise step 640 of transmitting, to the RAN node 900, a connection request message comprising the group ID to indicate that radio access is triggered for the group of UEs. The connection request message may be, for example, a Radio Resource Control (RRC) connection request message (Msg3). If the connection request was successfully received, the method 600 may further comprise step 650 of receiving, from the RAN node 900, a response message comprising a temporary group identity. The response message may be, for example, an RRC connection set up message (Msg4). The temporary group identity is a temporary identity to be used by the group when communicating with the RAN node 900. In some embodiments, the method 600 may further comprise the step 670 of broadcasting the received temporary group identity to the UEs assigned to the group. The temporary group identity may be, for example, a Cell-Radio Network Temporary Identity (C-RNTI).

In some embodiments, if the coordinator UE 800 is not registered to the wireless communications system, the transmitted connection request message may further comprise a UE identity identifying the coordinator UE 800. Thus, the connection request message transmitted by the coordinator UE 800 may comprise both the indicator identifying a group registration request, and the UE identity identifying the coordinator UE 800. Thus, the coordinator UE 800 may be registered to the network at the same time as the group of UEs are registered.

In some embodiments, if the authentication and security procedure is successfully performed, a context for the group of UEs in the Core Network (CN) may be set up. A CN node, for example an Access and Mobility management Function (AMF), may set up this context. The context may include CN bearers, Tunnel Endpoint IDentifiers TEIDs), which cell the group is using etc. As known in the art, the TEIDs are used for the CN communication, i.e. to identify the group of UEs when the data is transmitted between the RAN node 900 and a User Plane Function (UPF), and a UPF and a packet gateway. Downlink group TEIDs may be used to send downlink data and uplink TEIDs may be used to send uplink data. Accordingly, group connections may be established associated with the group TEIDs.

According to a second aspect, there is provided a method 700 in a RAN node 900 for registering a group of UEs to a wireless communications system.

Figure 7:
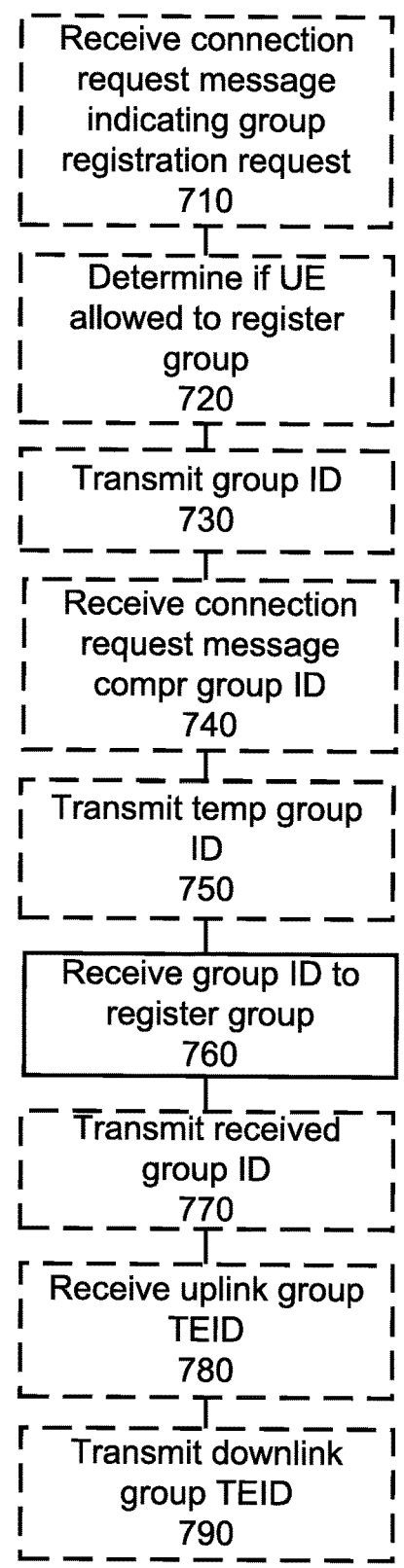
FIG. 7 is a flowchart of an example method performed by a RAN node.

With reference to the FIGS. 5a and 7, a first embodiment will now be described. As stated above, FIG. 5a illustrates a message sequence chart of a process for registering a group of UEs to a wireless communications system. FIG. 7 illustrates a method 700 in a RAN node 900 for registering a group of UEs to a wireless communications system. A group coordinator UE 800 represents the group of UEs.

The method comprises step 760 of receiving, from the coordinator UE 800, a message comprising a group ID to initiate an authentication and security procedure to register the group of UEs to the wireless communications system, i.e. the network. The group ID identifies the group of UEs.

Thus, the proposed method 700 provides a solution for performing an attach, or registration, procedure for a group of UEs to the wireless communications system. The RAN node 900 is informed about the group ID of the group of UEs that wants to register to the Core Network (CN) such that the group of UEs can receive services from the network, i.e. configure bearers. This information may thus be received in e.g. Msg5. This step is performed when the coordinator UE 800 already is registered to the network. Thus, the proposed method 700 enables a context to be set up for the group of UEs and provides a solution for registering a group of UEs to a network, such that 2-hop group cooperative transmissions can be supported.

In some embodiments, the method 700 may further comprise the step 770 of transmitting, to a CN node 510, the received message comprising the group ID to initiate the authentication and security procedure to register the group of UEs to the wireless communications system. The authentication and security procedure may be initiated to set up a context for the group of UEs and to establish security keys, which may be used for encryption of the group bearers.

In some embodiments, the method may further comprise, if the authentication and security procedure is successfully performed, the step of setting up a context for the group of UEs in the CN. The method may, for example, comprise step 780 of receiving, from the CN node 510, a registration accept message comprising at least one uplink group TEID to be used for sending uplink data. The method 700 may further comprise step 790 of transmitting, to the CN node 510, a response comprising at least one downlink group TEID to be used for sending uplink data.

In some embodiments, the method may further comprise step 710 of receiving, from the coordinator UE 800, a connection request message comprising an indicator identifying a group registration request. The method 700 may further comprise step 720 of determining if the coordinator UE 800 is allowed to register a group and, if the coordinator UE 800 is allowed to register a group, the method 700 may further comprise step 730 of transmitting, to the coordinator UE 800, a response message comprising the group ID.

In some embodiments, the method 700 may further comprise step 740 of receiving, from the coordinator UE 800, a connection request message comprising the group ID to indicate that radio access is triggered for the group. The method may further comprise step 750 of transmitting, to the coordinator UE 800, if the connection request was successfully received, a response message comprising a temporary group identity. The temporary group identity is a temporary identity to be used by the group when communicating with the RAN node 900. The temporary identity may be, for example, a C-RNTI.

In some embodiments, if the coordinator UE 800 is not registered to the wireless communications system, the received connection request message may further comprise a UE identity identifying the coordinator UE 800.

Figure 5B:
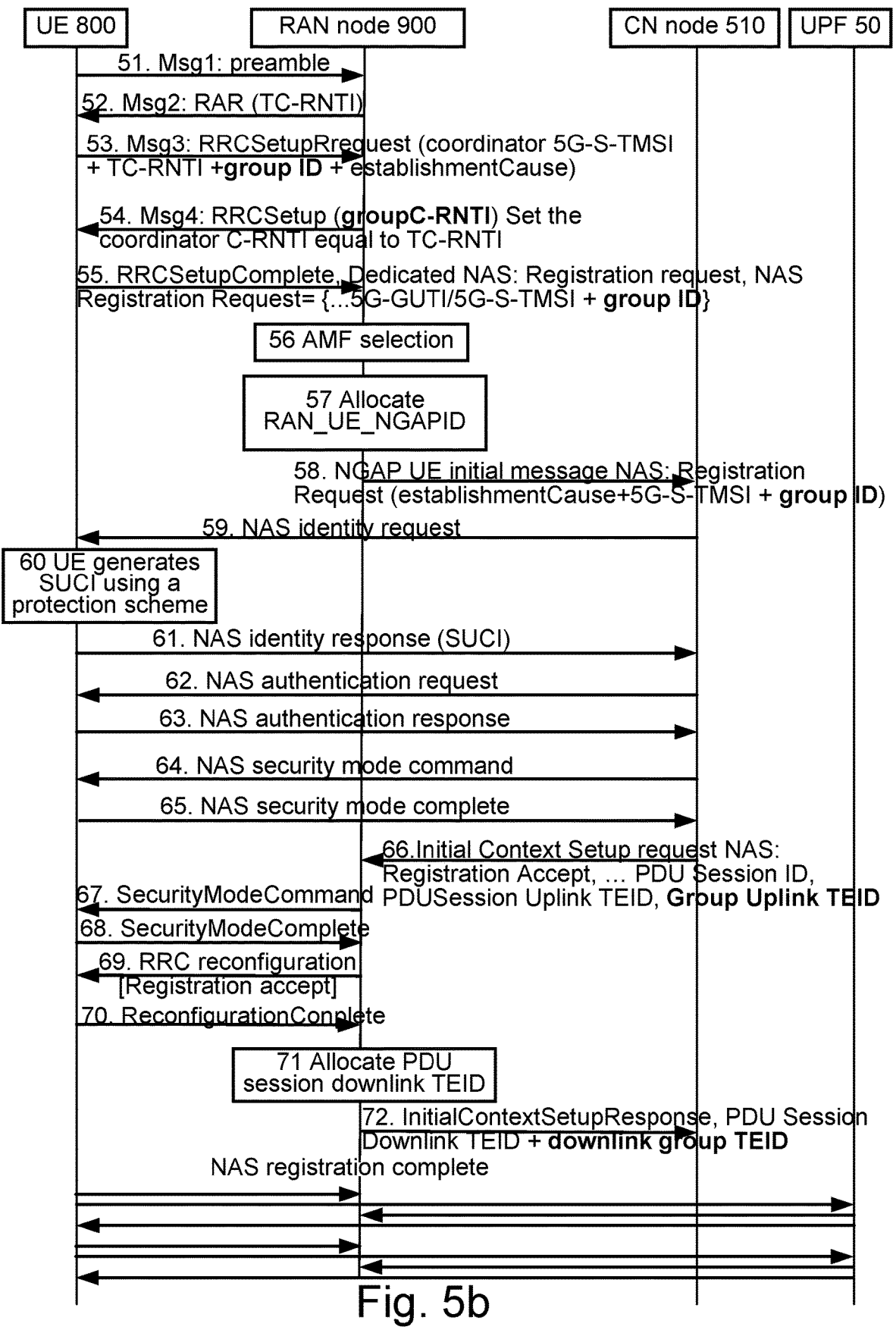
FIG. 5b shows an example embodiment for registering a group of UEs to a wireless communications system.

An example embodiment of the proposed methods 600, 700 is now going to be described with reference to FIG. 5b. As seen in FIG. 5b, the wireless communications system comprises a coordinator UE 800, a RAN node 900, a CN node 510 and a UPF 50. The RAN node 900 according to the present example embodiment is a gNB and the CN node 510 is an AMF. In the present example embodiment, the coordinator UE 800 has already established a group of UEs, but has not yet registered itself nor the group to the CN. Thus, the group of UEs already has a group ID.

The process for registering a group of UEs to a wireless communications system, according to the present example, starts with that a Random Access CHannel (RACH) procedure is initiated. The coordinator UE transmits a RACH preamble to the RAN node 900 in step 51 (Msg1) and receives a Random Access Response (RAR) in step 52 (Msg2). Thereafter, the coordinator UE 800, in step 53, transmits a connection request message, e.g. a RRC connection request (Msg3), to the RAN node 900. The RRC connection request comprises the UE identity identifying the coordinator UE 800 and the group ID, which identifies the group of UEs. It may be appreciated that if the coordinator UE 800 itself is already registered to the network, the RRC connection request does not have to comprise the UE identity. In step 54, if the RRC connection request was successfully received, the coordinator UE 800 receives a response message, e.g. a RRC connection setup (Msg4), comprising a temporary group identity. The temporary group identity is to be used by the group when communicating with the RAN node 900. The temporary group identity, according to the present example, is a group C-RNTI.

Thereafter, at step 55, the coordinator UE 800 transmits a message comprising a group ID to initiate authentication and security procedure to register the group of UEs to the wireless communications system. The message may be a RRC setup complete message. The message may initiate a Non-Access Stratum (NAS) authentication and security procedure. Thereafter, the message received by the RAN node 900 is transmitted to the CN node 510, i.e. the AMF. The message additionally includes a RAN UE NGAP ID and the RRC establishment cause.

In the authentication and security procedure, the AMF 510 and the coordinator UE 800 exchange an authentication challenge, a selected NAS security algorithm and the coordinator UE's International Mobile Equipment Identity Software version (IMEISV), illustrated as steps 59-65 in FIG. 5b. Thereafter, the AMF 510 initiates a session setup with the RAN node 900. The message typically contains the registration accept NAS message. The message carries one or more PDU session setup requests. Each PDU session is addressed with the PDU session ID. The message also carries the uplink TEID for every PDU session, including the group uplink TEID.

In step 69, a RRC reconfiguration message is sent to the UE for setting up radio bearers, setting up a secondary cell and initiating UE measurements. In steps 71 and 72, the TEID, per PDU session, that the UPF 50 will use to send downlink data to the RAN node 900 is allocated. This includes the downlink group TEID. Thereafter, the NAS registration is complete, and the coordinator UE 800 has connections with the network. The RAN node 900 will send UL data with the uplink TEID, while the UPF 50 will send the DL data with the downlink TEID. Additionally, the group of UEs will now have connections with the network. The RAN node 900 will send the group UL data with the uplink group TEID, while the UPF 50 will send the group DL data with the downlink group TEID. Accordingly, the group of UEs has been registered to the wireless communications system, via the coordinator UE 800, and thus, 2-hop cooperative group transmission is supported.

According to a third aspect, there is provided a coordinator UE 800 configured to perform the method 600 according to the first aspect.

The coordinator UE 800 is now going to be described with reference to FIG. 8. The coordinator UE 800 may be used in, but are not limited to, a wireless communication system. The coordinator UE 800 represents the group of UEs.

The coordinator UE 800 is configured for registering a group of UEs to a wireless communications system. As illustrated in FIG. 8, the coordinator UE 800 comprises a processor, or a processing circuitry 810, and a memory, or a memory circuitry 820.

Additionally, or alternatively, the coordinator UE 800 may further comprise a transmitter, or a transmitting circuitry 840, configured to transmit data to other apparatuses, such as the RAN node 900.

Additionally, or alternatively, the coordinator UE 800 may further comprise a receiver, or a receiving circuitry 830, configured to receive data from other apparatuses, such as the RAN node 900.

The memory circuit 820 stores computer program code which, when run in the processing circuitry 810, causes the coordinator UE 800 to transmit, to the RAN node 900, a message comprising a group ID to initiate an authentication and security procedure to register the group of UEs with to the wireless communications system. The group ID identifies the group of UEs.

In some embodiments, the memory circuitry 820 storing computer program code which, when run in the processing circuitry 810, may further cause the coordinator UE 800 to transmit, to the RAN node 900, a connection request message comprising an indicator identifying a group registration request. The coordinator UE 800 may further be caused to receive, from the RAN node 900, if the coordinator UE 800 is allowed to register a group, a response message comprising a group ID.

In some embodiments, the memory circuitry 820 storing computer program code which, when run in the processing circuitry 810, may further cause the coordinator UE 800 to assign at least one UE to the group by associating the at least one UE with the group ID.

In some embodiments, the memory circuitry 820 storing computer program code which, when run in the processing circuitry 810, may further cause the coordinator UE 800 to transmit, to the RAN node 900, a connection request message comprising the group ID to indicate that radio access is triggered for the group of UEs. The coordinator UE 800 may further be caused to receive, from the RAN node 900, if the connection request was successfully received, a response message comprising a temporary group identity. The temporary group identity is a temporary identity to be used by the group when communicating with the RAN node.

In some embodiments, the memory circuitry 820 storing computer program code which, when run in the processing circuitry 810, may further cause the coordinator UE 800 to broadcast the received temporary group identity to the UEs assigned to the group. The temporary group identity may be a C-RNTI.

In some embodiments, if the coordinator UE 800 is not registered to the wireless communications system, the transmitted connection request message may further comprise an UE identity identifying the coordinator UE.

In some embodiments, if the authentication and security procedure is successfully performed, group TEIDs may be assigned for the group of UEs. A downlink group TEID may be used to send downlink data and an uplink group TEID may be used to send uplink data.

According to a fourth aspect, there is provided a RAN node 900 for implementing the method 700 according to the second aspect.

The RAN node 900 is now going to be described with reference to FIG. 9. The RAN node 900 may be used in, but are not limited to, wireless communications system.

The RAN node 900 is configured for registering a group of UEs to a wireless communications system. A coordinator UE 800 represents the group of UEs. As illustrated in FIG. 9, the RAN node 900 comprises a processor, or a processing circuitry 910, and a memory, or a memory circuitry 920.

Additionally, or alternatively, the RAN node 900 may further comprise a transmitter, or a transmitting circuitry 940, configured to transmit data to other apparatuses, such as the coordinator UE 800.

Additionally, or alternatively, the RAN node 900 may further comprise a receiver, or a receiving circuitry 930, configured to receive data from other apparatuses, such as the coordinator UE 800.

The memory circuitry 920 stores computer program code which, when run in the processing circuitry 910, causes the RAN node 900 to receive, from the coordinator UE 800, a message comprising a group ID to initiate an authentication and security procedure to register the group of UEs to the wireless communications network. The group ID identifies the group UEs.

In some embodiments, the memory circuitry 920 storing computer program code which, when run in the processing circuitry 910, may further cause the RAN node 900 to transmit, to a CN node 510, the received message comprising the group ID to initiate the authentication and security procedure to register the group of UEs to the wireless communications system.

In some embodiments, the memory circuitry 920 storing computer program code which, when run in the processing circuitry 910, if the authentication and security procedure is successfully performed, may further cause the RAN node 900 to set up a context for the group of UEs in the CN. The RAN node 900 may be caused to receive, from the CN node 510, a registration accept message comprising at least one uplink group TEID, to be used for sending uplink data. The RAN node 900 may further be caused to transmit, to the CN node 510, a response comprising at least one downlink group TEID to be used for sending uplink data.

In some embodiments, the memory circuitry 920 storing computer program code which, when run in the processing circuitry 910, may further cause the RAN node 900 to receive, from the coordinator UE 800, a connection request message comprising an indicator indicating a group registration request. The RAN node 900 may further be caused to determine if the coordinator UE 800 is allowed to register a group and, if the coordinator UE 800 is allowed to register a group, transmit, to the coordinator UE 800, a response message comprising the group ID.

In some embodiments, the memory circuitry 920 storing computer program code which, when run in the processing circuitry 910, may further cause the RAN node 900 to receive, from the coordinator UE 800, a connection request message comprising the group ID to indicate that radio access is triggered for the group. The RAN node 900 may further be caused to transmit, to the coordinator UE 800, if the connection request was successfully received, a response message comprising a temporary group identity. The temporary group identity is a temporary identity to be used by the group when communicating with the RAN node 900. The temporary group identity may be a C-RNTI.

In some embodiments, if the coordinator UE 800 is not registered to the wireless communications system, the received connection request message may further comprises an UE identity identifying the coordinator UE 800.

In some embodiments, the RAN node 900 may be an eNB. In other embodiments, the RAN node 900 may be a gNB.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

Figure 10:
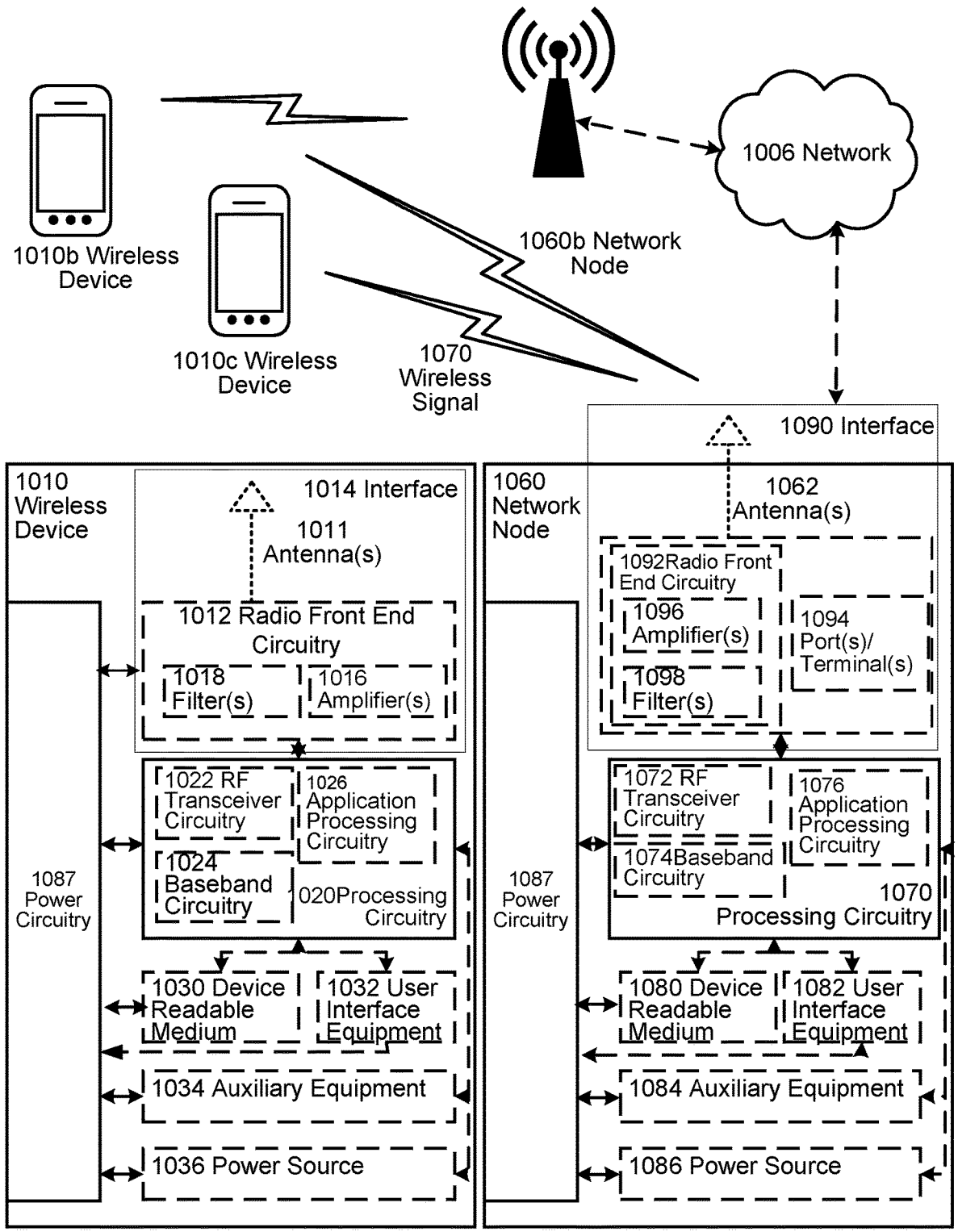
FIG. 10 illustrates an example wireless network.

Although the subject matter described herein may be implemented in any appropriate type of system using any suitable components, the embodiments described herein relate to a wireless network, such as the example wireless communication network illustrated in FIG. 10. For simplicity, the wireless communication network of FIG. 10 only depicts network 1006, network nodes 1060 and 1060*b*, and Wireless Devices (WDs) 1010, 1010*b*, and 1010*c*. The wireless communication network may further include any additional elements suitable to support communication between wireless devices or between a wireless device and another communication device, such as a landline telephone. Of the illustrated components, network node 1060 and wireless device (WD) 1010 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 1060 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 10, Network node 1060 includes processing circuitry 1070, device readable medium 1080, interface 1090, user interface equipment 1082, auxiliary equipment 1084, power source 1086, power circuitry 1087, and antenna 1062. Although network node 1060 illustrated in the example wireless communication network of FIG. 10 may represent a device that includes the illustrated combination of hardware components, other embodiments may comprise network nodes with different combinations of components.

It is to be understood that a network node may comprise any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be provided by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 10100 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070.

In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. AWD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1013 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1013 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
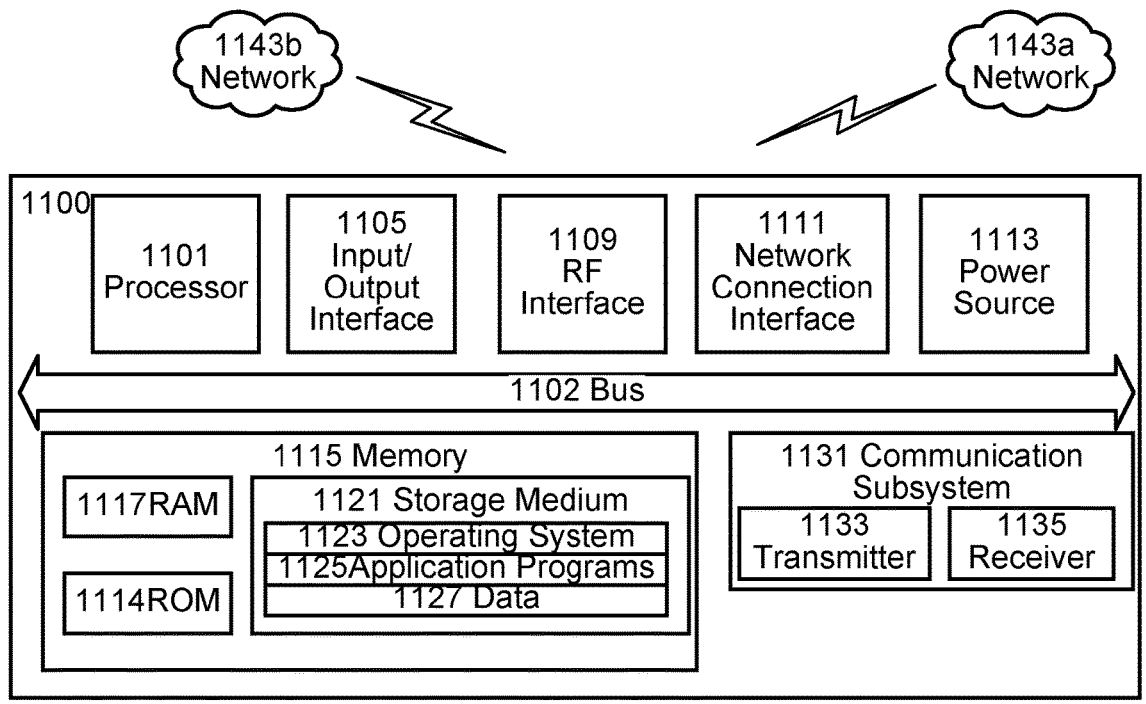
FIG. 11 shows a user equipment according to an embodiment.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1114, and storage medium 1121 or the like, communication subsystem 1131, power source 1113, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1114 may be configured to provide computer instructions or data to processing circuitry 1101. For example, ROM 1114 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power 5 source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
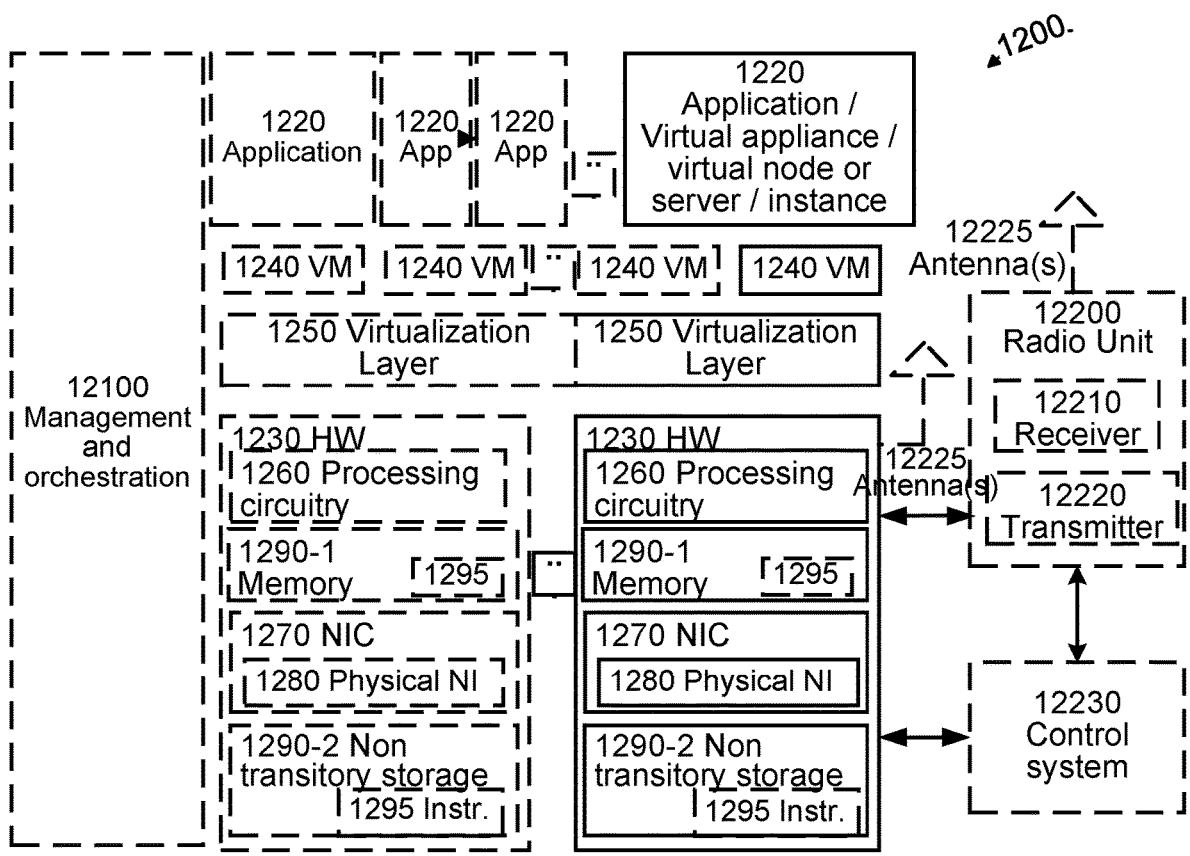
FIG. 12 shows a virtualization environment according to an embodiment.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analogue hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE))

where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
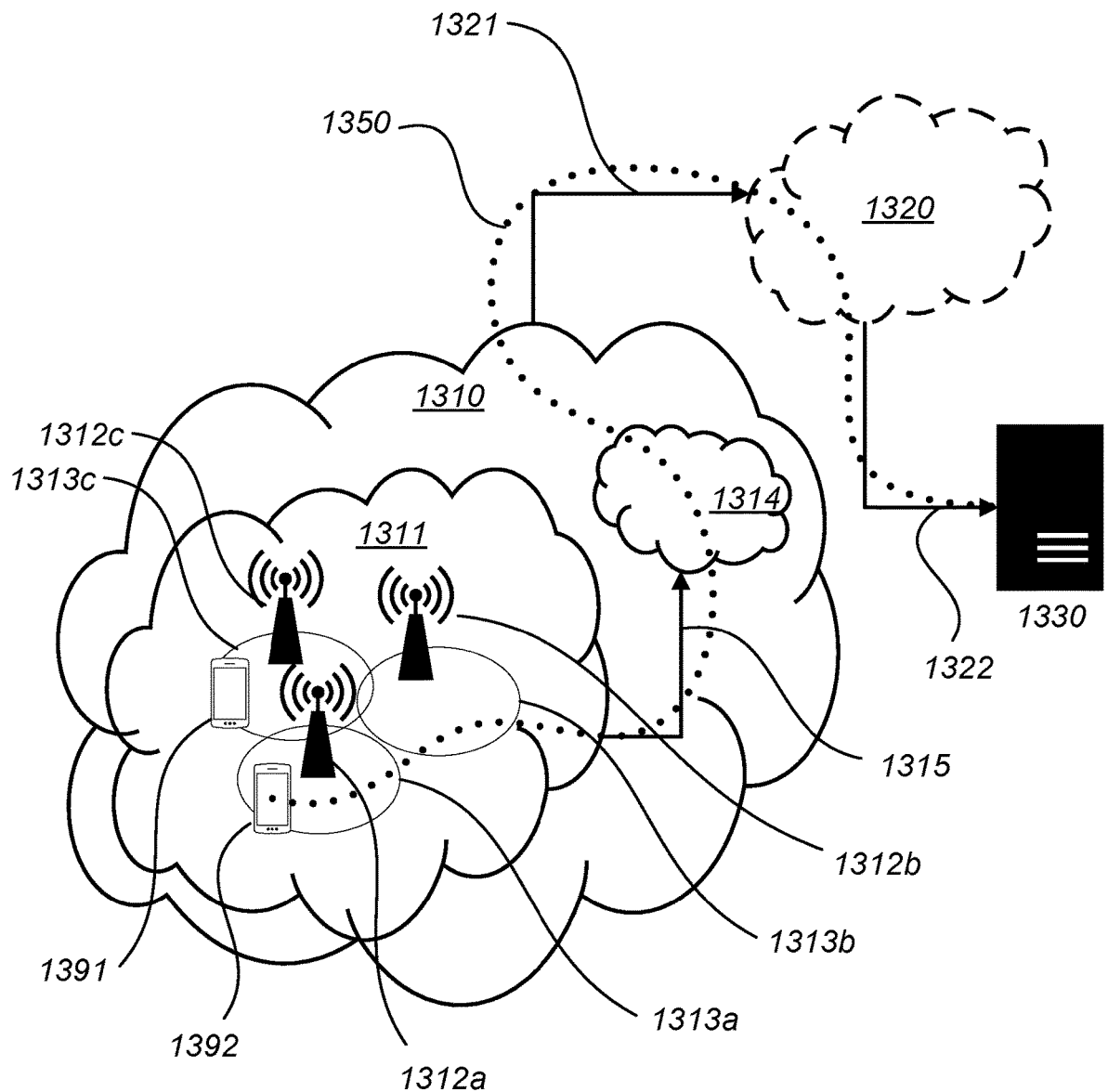
FIG. 13 illustrates an example telecommunication network connected via an intermediate network to a host computer.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1316 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
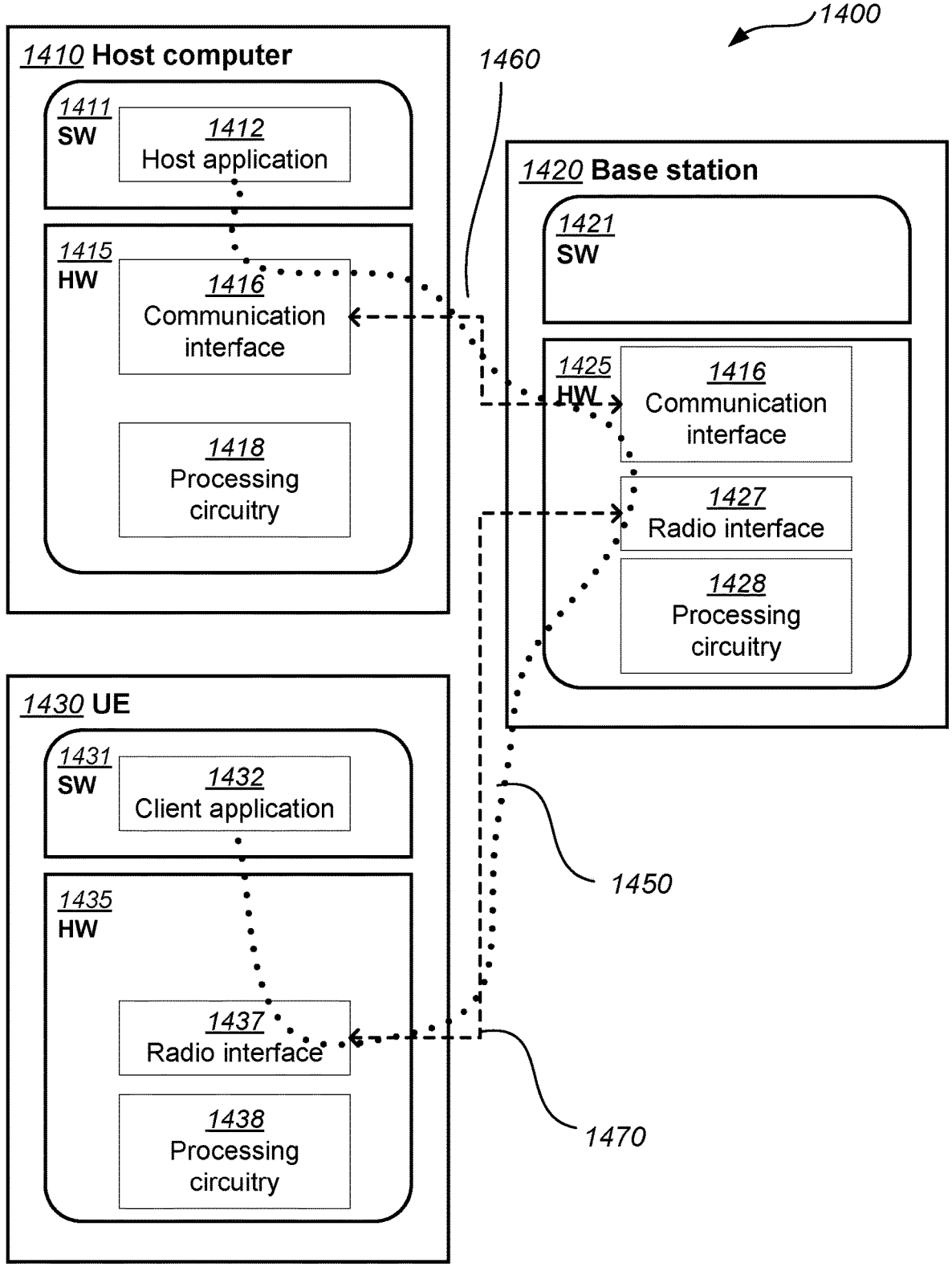
FIG. 14 shows a host computer communicating via a base station with a user equipment over a partially wireless connection according to an embodiment.

It is noted that host computer 1410, base station 1420 and UE 1430 illustrated in FIG. 14 may be similar or identical to host computer 1430, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figures 15, 16:
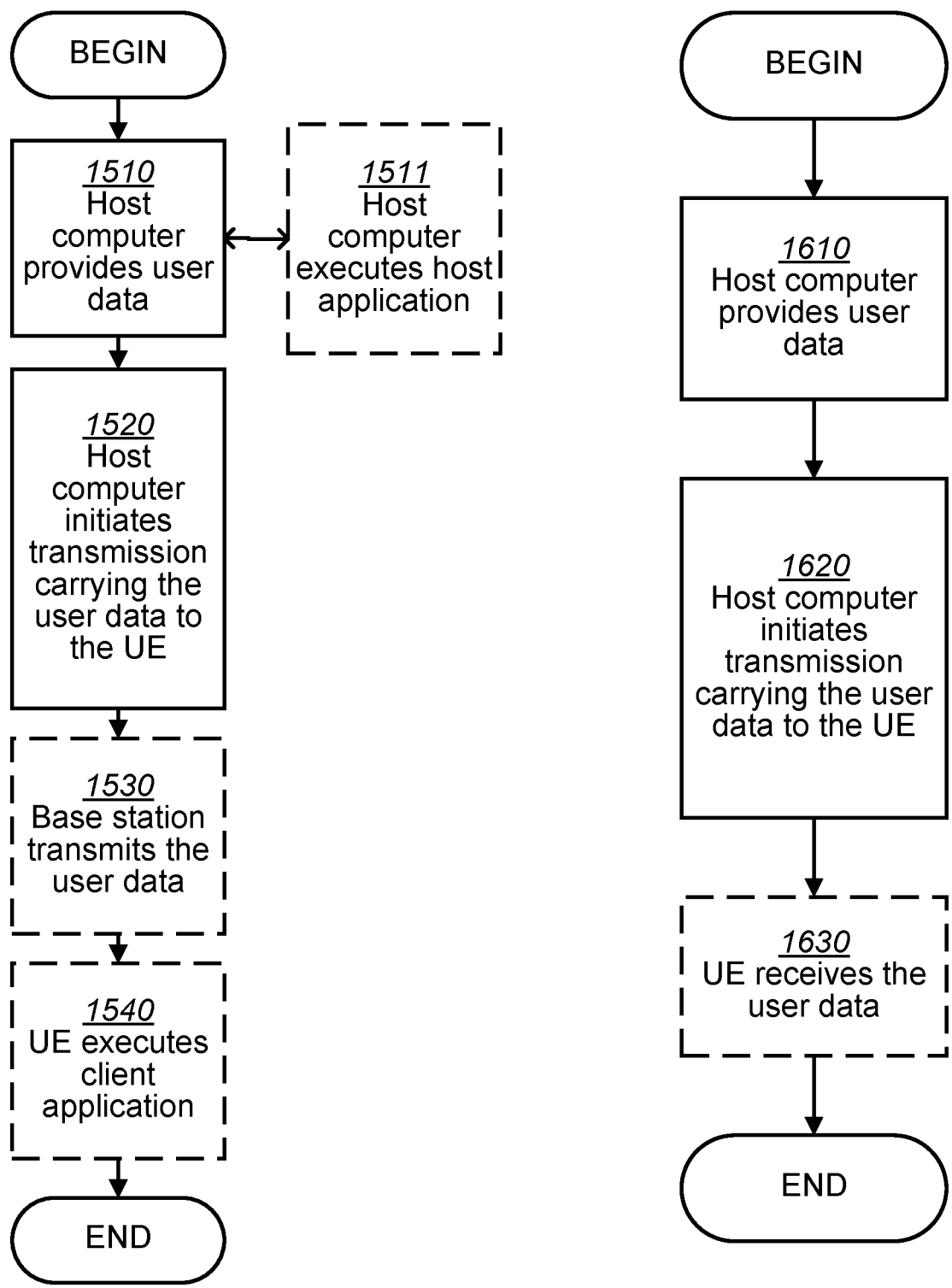
FIGS. 15 and 16 show example methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional)

of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Numbered Embodiments in Particular Related to FIGS. 10-18

1. A Radio Access Network node configured to communicate with a coordinator User Equipment (UE), the RAN node comprising a radio interface and processing circuitry configured to:
   receive, from the coordinator UE, a message comprising a group IDentity (ID) to initiate an authentication and security procedure to register the group of UEs to the wireless communications network, wherein the group ID identifies the group UEs.

2. The RAN node according to embodiment 1, wherein the RAN node further is configured to:
   transmit, to a Core Network (CN) node, the received message comprising the group ID to initiate the authentication and security procedure to register the group of UEs to the wireless communications system.

3. The RAN node according to embodiment 2, wherein, if the authentication and security procedure is successfully performed, the RAN node further is configured to:
   receive, from the CN node, a registration accept message comprising at least one uplink group Tunnel Endpoint Identifier (TEID) to be used for sending uplink data; and
   transmit, to the CN node, a response comprising at least one downlink group TEID to be used for sending uplink data.

4. The RAN node according to any of embodiments 1 to 3, wherein the RAN node further is configured to:
   receive, from the coordinator UE, a connection request message comprising an indicator indicating a group registration request;
   determine if the coordinator UE is allowed to register a group, and
   if the coordinator UE is allowed to register a group, transmit, to the coordinator UE, a response message comprising the group ID.

5. The RAN node according to embodiment 2 to 4, wherein the RAN node is further configured to:
   receive, from the coordinator UE, a connection request message comprising the group ID to indicate that radio access is triggered for the group; and
   transmit, to the coordinator UE, if the connection request was successfully received, a response message comprising a temporary group identity, wherein the temporary group identity is a temporary identity to be used by the group when communicating with the RAN node.

6. The RAN node according to embodiment 5, wherein the temporary group identity is a Cell-Radio Network Temporary Identity (C-RNTI).

7. The RAN node according to any of embodiments 2 to 6, wherein, if the coordinator UE (300) is not registered to the wireless communications system, the received connection request message further comprises an UE identity identifying the coordinator UE.

8. A communication system including a host computer comprising:
   processing circuitry configured to provide user data; and
   a communication interface configured to forward the user data to a cellular network for transmission to a coordinator User Equipment (UE),
   wherein the cellular network comprises a RAN node having a radio interface and processing circuitry, the RAN node's processing circuitry configured to receive, from the coordinator UE, a message comprising a group IDentity (ID) to initiate an authentication and security procedure to register the group of UEs to the wireless communications network, wherein the group ID identifies the group UEs.

9. The communication system of embodiment 8, further including the RAN node.

10. The communication system of embodiment 9, further including the coordinator UE, wherein the coordinator UE is configured to communicate with the RAN node.

11. The communication system of embodiment 10, wherein:
   the processing circuitry of the host computer is configured to execute a host application, thereby providing the user data; and
   the UE comprises processing circuitry configured to execute a client application associated with the host application.

12. A method implemented in a RAN node, comprising receiving, from a coordinator User Equipment (UE), a message comprising a group IDentity (ID) to initiate an authentication and security procedure to register the group of UEs to the wireless communications system, wherein the group ID identifies the group of UEs.

13. A method implemented in a communication system including a host computer, a RAN node and a coordinator User Equipment (UE), the method comprising:
   at the host computer, providing user data; and
   at the host computer, initiating a transmission carrying the user data to the coordinator UE via a cellular network comprising the RAN node, wherein the RAN node
      receiving, from the coordinator UE, a message comprising a group IDentity (ID) to initiate an authentication and security procedure to register the group of UEs to the wireless communications system, wherein the group ID identifies the group of UEs.

14. The method of embodiment 13, further comprising:
   at the RAN node, transmitting the user data.

15. The method of embodiment 14, wherein the user data is provided at the host computer by executing a host application, the method further comprising:
   at the UE, executing a client application associated with the host application.

16. A coordinator User Equipment (UE) configured to communicate with a Radio Access Network (RAN) node, the UE comprising a radio interface and processing circuitry configured to transmit and receive data to and from the RAN node.

17. A communication system including a host computer comprising:
   processing circuitry configured to provide user data; and
   a communication interface configured to forward user data to a cellular network for transmission to a User Equipment (UE),
   wherein the UE comprises a radio interface and processing circuitry, the UE's processing circuitry configured to transmit and receive data to and from a Radio Access Network (RAN) node.

18. The communication system of embodiment 17, further including the UE.

19. The communication system of embodiment 17, wherein the cellular network further includes a RAN node configured to communicate with the UE.

20. The communication system of embodiment 18 or 19, wherein:
   the processing circuitry of the host computer is configured to execute a host application, thereby providing the user data; and
   the UE's processing circuitry is configured to execute a client application associated with the host application.

21. A method implemented in a communication system including a host computer, a Radio Access Network (RAN) node and a coordinator User Equipment (UE), the method comprising:
   at the host computer, providing user data; and
   at the host computer, initiating a transmission carrying the user data to the coordinator UE via a cellular network comprising the RAN node, wherein the coordinator UE transmits and receives to and from the RAN node.

22. The method of embodiment 21, further comprising:
   at the coordinator UE, receiving the user data from the RAN node.

23. A communication system including a host computer comprising:
   a communication interface configured to receive user data originating from a transmission from a coordinator User Equipment (UE) to a Radio Access Network (RAN) node, wherein the coordinator UE comprises a radio interface and processing circuitry, the coordinator UE's processing circuitry configured to transmit and receive data to and from the RAN node.

24. The communication system of embodiment 23, further including the coordinator UE.

25. The communication system of embodiment 24, further including the RAN node, wherein the RAN node comprises a radio interface configured to communicate with the coordinator UE and a communication interface configured to forward to the host computer the user data carried by a transmission from the coordinator UE to the RAN node.

26. The communication system of embodiment 24 or 25, wherein:
   the processing circuitry of the host computer is configured to execute a host application;
   and the coordinator UE's processing circuitry is configured to execute a client application associated with the host application, thereby providing the user data.

27. The communication system of embodiment 25 or 26, wherein:
   the processing circuitry of the host computer is configured to execute a host application, thereby providing request data; and
   the coordinator UE's processing circuitry is configured to execute a client application associated with the host application, thereby providing the user data in response to the request data.

28. A method implemented in a coordinator User Equipment (UE), comprising transmitting and receiving data to and from a Radio Access Network (RAN) node.

29. The method of embodiment 28, further comprising:
   providing user data; and
   forwarding the user data to a host computer via the transmission to the RAN node.

30. A method implemented in a communication system including a host computer, a Radio Access Network (RAN) node and a coordinator User Equipment (UE), the method comprising:
   at the host computer, receiving user data transmitted to the RAN node from the UE, wherein the coordinator UE transmitting and receiving data to and from the RAN node.

31. The method of embodiment 30, further comprising:
   at the coordinator UE, providing the user data to the RAN node.

32. The method of embodiment 31, further comprising:
   at the coordinator UE, executing a client application, thereby providing the user data to be transmitted; and
   at the host computer, executing a host application associated with the client application.

33. The method of embodiment 32, further comprising:
   at the coordinator UE, executing a client application; and
   at the coordinator UE, receiving input data to the client application, the input data being provided at the host computer by executing a host application associated with the client application,
   wherein the user data to be transmitted is provided by the client application in response to the input data.

34. A communication system including a host computer comprising a communication interface configured to receive user data originating from a transmission from a coordinator User Equipment (UE) to a Radio Access Network (RAN) node, wherein the RAN node comprises a radio interface and processing circuitry, the RAN node's processing circuitry configured to receive, from the coordinator UE, a message comprising a group IDentity (ID) to initiate an authentication and security procedure to register the group of UEs to the wireless communications network, wherein the group ID identifies the group UEs.

35. The communication system of embodiment 34, further including the RAN node.

36. The communication system of embodiment 35, further including the coordinator UE, wherein the coordinator UE is configured to communicate with the RAN node.

37. The communication system of embodiment 36, wherein:
   the processing circuitry of the host computer is configured to execute a host application;
   the coordinator UE is configured to execute a client application associated with the host application, thereby providing the user data to be received by the host computer.

38. A method implemented in a communication system including a host computer, a Radio Access Network (RAN) node and a coordinator User Equipment (UE), the method comprising:
   at the host computer, receiving, from the RAN node, user data originating from a transmission which the RAN node has received from the coordinator UE, wherein the coordinator UE transmits and receives data to and from the RAN node.

39. The method of embodiment 38, further comprising:
   at the RAN node, receiving the user data from the coordinator UE.

40. The method of embodiment 39, further comprising:
   at the RAN node, initiating a transmission of the received user data to the host computer.

41. A coordinator User Equipment (UE) configured to communicate with a Radio Access Network (RAN) node, the coordinator UE comprising a radio interface and processing circuitry configured to:
   transmit, to the RAN, node, a message comprising a group IDentity (ID) to initiate an authentication and security procedure to register the group of UEs with to the wireless communications system, wherein the group ID identifies the group of UEs.

42. The coordinator UE according to embodiment 41, wherein coordinator UE further is configure to:
   transmit, to the RAN node, a connection request message comprising an indicator identifying a group registration request; and
   receive, from the RAN node, if the coordinator UE is allowed to register a group, a response message comprising a group ID.

43. The coordinator UE according to embodiment 42, wherein the coordinator UE further is configured to:
   assign at least one UE to the group by associating the at least one UE with the group ID.

44. The coordinator UE according to any of embodiment 41 to 43, wherein the coordinator UE further is configured to
   transmit, to the RAN node, a connection request message comprising the group ID to indicate that radio access is triggered for the group of UEs; and
   receive, from the RAN node, if the connection request was successfully received, a response message comprising a temporary group identity, wherein the temporary group identity is a temporary identity to be used by the group when communicating with the RAN node.

45. The coordinator UE according to embodiments 44, wherein the coordinator UE further is configured to:
   broadcast the received temporary group identity to the UEs assigned to the group.

46. The coordinator UE according to any of embodiments 44 to 45, wherein the temporary group identity is a Cell-Radio Network Temporary Identity (C-RNTI).

47. The coordinator UE according to any of embodiments 42 to 46, wherein, if the coordinator UE (300) is not registered to the wireless communications system, the transmitted connection request message further comprises an UE identity identifying the coordinator UE.

48. The coordinator UE according to any of embodiments 41 to 47, wherein, if the authentication and security procedure is successfully performed, group Tunnel Endpoint Identifiers (TEIDs) are assigned for the group of UEs, wherein a downlink group TEID is used to send downlink data and an uplink group TEID is used to send uplink data.

49. A communication system including a host computer comprising:
   processing circuitry configured to provide user data; and
   a communication interface configured to forward the user data to a cellular network for transmission to a coordinator User Equipment (UE),
   wherein the cellular network comprises a coordinator UE having a radio interface and processing circuitry, the base station's processing circuitry configured to transmit, to a Radio Access Network (RAN) node, a message comprising a group IDentity (ID) initiate an authentication and security procedure to register the group of UEs with to the wireless communications system, wherein the group ID identifies the group of UEs.

50. The communication system of embodiment 49, further including the RAN node.

51. The communication system of embodiment 50, further including the coordinator UE, wherein the coordinator UE is configured to communicate with the RAN node.

52. The communication system of embodiment 51, wherein:
   the processing circuitry of the host computer is configured to execute a host application, thereby providing the user data; and the coordinator UE comprises processing circuitry configured to execute a client application associated with the host application.

53. A method implemented in a coordinator UE, comprising
transmitting, to a Radio Access Network (RAN) node, a message comprising a group IDentity (ID) to initiate an authentication and security procedure to register the group of UEs to the wireless communications system, wherein the group ID identifies the group of UEs.

54. A method implemented in a communication system including a host computer, a coordinator User Equipment (UE) and a Radio Access Network (RAN) node, the method comprising:
at the host computer, providing user data; and
at the host computer, initiating a transmission carrying the user data to the coordinator UE via a cellular network comprising the coordinator UE, wherein the coordinator UE
transmitting, to a Radio Access Network (RAN) node, a message comprising a group IDentity (ID) to initiate an authentication and security procedure to register the group of UEs to the wireless communications system, wherein the group ID identifies the group of UEs.

55. The method of embodiment 54, further comprising:
at the coordinator UE, transmitting the user data.

56. The method of embodiment 54, wherein the user data is provided at the host computer by executing a host application, the method further comprising:
at the coordinator UE, executing a client application associated with the host application.

57. A coordinator User Equipment (UE) configured to communicate with a Radio Access Network (RAN) node, the coordinator UE comprising a radio interface and processing circuitry configured to transmit and receive data to and from the RAN node.

58. A communication system including a host computer comprising:
processing circuitry configured to provide user data; and
a communication interface configured to forward user data to a cellular network for transmission to a coordinator User Equipment (UE),
wherein the coordinator UE comprises a radio interface and processing circuitry, the coordinator UE's processing circuitry configured to transmit and receive data to and from a Radio Access Network (RAN) node.

59. The communication system of embodiment 58, further including the coordinator UE.

60. The communication system of embodiment 59, wherein the cellular network further includes a RAN node configured to communicate with the first coordinator UE.

61. The communication system of embodiment 58 or 59, wherein:
the processing circuitry of the host computer is configured to execute a host application, thereby providing the user data; and
the coordinator UE's processing circuitry is configured to execute a client application associated with the host application.

62. A method implemented in a communication system including a host computer, a first coordinator User Equipment (UE) and Radio Access Network (RAN) node, the method comprising:
at the host computer, providing user data; and
at the host computer, initiating a transmission carrying the user data to the RAN node via a cellular network comprising the RAN node, wherein the coordinator UE transmits and receives to and from the RAN node.

63. The method of embodiment 62, further comprising:
at the coordinator UE, receiving the user data from the RAN node.

64. A communication system including a host computer comprising:
a communication interface configured to receive user data originating from a transmission from a coordinator User Equipment (UE) to a Radio Access Network (RAN) node,
wherein the coordinator UE comprises a radio interface and processing circuitry, the coordinator UE's processing circuitry configured to transmit and receive data to and from the RAN node.

65. The communication system of embodiment 64, further including the coordinator UE.

66. The communication system of embodiment 65, further including the RAN node, wherein the RAN node comprises a radio interface configured to communicate with the coordinator UE and a communication interface configured to forward to the host computer the user data carried by a transmission from the coordinator UE to the RAN node.

67. The communication system of embodiment 65 or 66, wherein:
the processing circuitry of the host computer is configured to execute a host application;
and the coordinator UE's processing circuitry is configured to execute a client application associated with the host application, thereby providing the user data.

68. The communication system of embodiment 65 or 66, wherein:
the processing circuitry of the host computer is configured to execute a host application, thereby providing request data; and
the coordinator UE's processing circuitry is configured to execute a client application associated with the host application, thereby providing the user data in response to the request data.

69. A method implemented in a coordinator User Equipment (UE), comprising transmitting and receiving data to and from a Radio Access Network (RAN) node.

70. The method of embodiment 69, further comprising:
providing user data; and
forwarding the user data to a host computer via the transmission to the RAN node.

71. A method implemented in a communication system including a host computer, a coordinator User Equipment (UE) and a Radio Access Network (RAN) node, the method comprising:
at the host computer, receiving user data transmitted to the RAN node from the coordinator UE, wherein the coordinator UE transmitting and receiving data to and from the RAN node.

72. The method of embodiment 71, further comprising:
at the coordinator UE, providing the user data to the RAN node.

73. The method of embodiment 72, further comprising:
- at the coordinator UE, executing a client application, thereby providing the user data to be transmitted; and
- at the host computer, executing a host application associated with the client application.

74. The method of embodiment 73, further comprising:
- at the coordinator UE, executing a client application; and
- at the coordinator UE, receiving input data to the client application, the input data being provided at the host computer by executing a host application associated with the client application,
- wherein the user data to be transmitted is provided by the client application in response to the input data.

75. A communication system including a host computer comprising a communication interface configured to receive user data originating from a transmission from a coordinator User Equipment (UE) to a Radio Access Network (RAN) node, wherein the coordinator UE comprises a radio interface and processing circuitry, the coordinator UE's processing circuitry configured to transmit, to the RAN node, a message comprising a group IDentity (ID) to initiate an authentication and security procedure to register the group of UEs to the wireless communications system, wherein the group ID identifies the group of UEs.

76. The communication system of embodiment 75, further including the RAN node.

77. The communication system of embodiment 76, further including the coordinator UE, wherein the coordinator UE is configured to communicate with the RAN node.

78. The communication system of embodiment 77, wherein:
- the processing circuitry of the host computer is configured to execute a host application;
- the coordinator UE is configured to execute a client application associated with the host application, thereby providing the user data to be received by the host computer.

79. A method implemented in a communication system including a host computer, a coordinator User Equipment (UE) and a Radio Access Network (RAN) node, the method comprising:
- at the host computer, receiving, from the RAN node, user data originating from a transmission which the RAN node has received from the coordinator UE, wherein the coordinator UE transmits and receives data to and from the RAN node.

80. The method of embodiment 79, further comprising:
- at the RAN node, receiving the user data from the coordinator UE.

81. The method of embodiment 80, further comprising:
- at the RAN node, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method in a coordinator User Equipment (UE) for registering a group of UEs to a wireless communications system, wherein the coordinator UE represents the group of UEs, the method comprising:
- transmitting, to a Radio Access Network (RAN) node, a connection request message comprising an indicator identifying a group registration request,
- obtaining a group IDentity (ID), wherein obtaining the group ID comprises receiving, from the RAN node, a response message responsive to the connection request message and the response message comprises the group ID, and
- the coordinator UE transmitting, to the RAN node, a message comprising the group ID to initiate an authentication and security procedure to register the group of UEs to the wireless communications system, wherein
- the group ID identifies the group of UEs, and
- the group ID does not uniquely identify the coordinator UE.

2. The method of claim 1, further comprising:
assigning at least one UE to the group by associating the at least one UE with the group ID.

3. The method of claim 1, further comprising:
- prior to transmitting to the RAN node the message comprising the group ID, transmitting, to the RAN node, a connection request message comprising a UE identity and the group ID to indicate that radio access is triggered for the group of UEs, wherein the UE identity uniquely identifies the coordinator UE; and
- receiving, from the RAN node a response message responsive to the connection request message, wherein the response message comprises a temporary group identity, and
- the temporary group identity is a temporary identity to be used by the group when communicating with the RAN node.

4. The method of claim 3, further comprising:
broadcasting the received temporary group identity to the UEs assigned to the group.

5. The method of claim 3, wherein the temporary group identity is a Cell-Radio Network Temporary Identity, C-RNTI.

6. The method of claim 1, wherein the transmitted connection request message further comprises a UE identity identifying the coordinator UE.

7. The method of claim 1, wherein a context for the group of UEs is set up in a Core Network.

8. A non-transitory computer readable medium storing a computer program comprising instructions which, when executed by processing circuitry, cause the processing circuitry to carry out the method of claim 1.

9. A method in a Radio Access Network (RAN) node for registering a group of user equipments (UEs) to a wireless communications system, wherein a coordinator UE represents the group of UEs, the method comprising:
  receiving, from the coordinator UE, a message comprising a group IDentity (ID) to initiate an authentication and security procedure to register the group of UEs to the wireless communications system, wherein
  the group ID identifies the group of UEs, and
  the group ID does not uniquely identify the coordinator UE;
  transmitting, to a core network (CN) node, the received message comprising the group ID to initiate the authentication and security procedure to register the group of UEs to the wireless communications system;
  receiving, from the CN node, a registration accept message comprising at least one uplink group Tunnel Endpoint Identifier (TEID) to be used for sending uplink data; and
  transmitting, to the CN node, a response comprising at least one downlink group TEID to be used for sending downlink data.

10. The method of claim 9, wherein the method further comprises:
  receiving, from the coordinator UE, a connection request message comprising an indicator identifying a group registration request;
  determining if the coordinator UE is allowed to register a group, and
  if the coordinator UE is allowed to register a group, transmitting, to the coordinator UE, a response message comprising the group ID.

11. The method of claim 9, wherein the method further comprises:
  receiving, from the coordinator UE, a connection request message comprising the group ID to indicate that radio access is triggered for the group; and
  transmitting, to the coordinator UE, if the connection request was successfully received, a response message comprising a temporary group identity, wherein the temporary group identity is a temporary identity to be used by the group when communicating with the RAN node.

12. The method of claim 11, wherein the temporary group identity is a Cell-Radio Network Temporary Identity.

13. The method of claim 11, wherein the received connection request message further comprises a UE identity identifying the coordinator UE.

14. A coordinator User Equipment (UE) configured for registering a group of UEs to a wireless communications system, wherein the coordinator UE represents the group of UEs, wherein the coordinator UE comprises:
  a processing circuitry; and
  a memory circuitry storing computer program code which, when run in the processing circuitry, causes the coordinator UE to:
  transmit, to a Radio Access Network (RAN) node, a connection request message comprising an indicator identifying a group registration request,
  obtain a group IDentity (ID), wherein the obtain the group ID comprises receiving, from the RAN node, a response message responsive to the connection request message and the response message comprises the group ID, and
  transmit, to the RAN node, a message comprising the group ID to initiate an authentication and security procedure to register the group of UEs with to the wireless communications system, wherein
  the group ID identifies the group of UEs, and
  the group ID does not uniquely identify the coordinator UE.

15. The coordinator UE of claim 14, wherein the memory circuitry storing computer program code which, when run in the processing circuitry, further causes the coordinator UE to:
  transmit, to the RAN node, a connection request message comprising an indicator identifying a group registration request; and
  receive, from the RAN node, a response message comprising a group ID.

16. A Radio Access Network (RAN) node configured for registering a group of user equipments (UEs) to a wireless communications system, wherein a coordinator UE represents the group of UEs, wherein the RAN node comprises:
  a processing circuitry; and
  a memory circuitry storing computer program code which, when run in the processing circuitry, causes the RAN node to:
  receive, from the coordinator UE, a message comprising a group IDentity (ID) to initiate an authentication and security procedure to register the group of UEs to the wireless communications network, wherein
  the group ID identifies the group UEs, and
  the group ID does not uniquely identify the coordinator UE;
  transmit, to a core network (CN) node, the received message comprising the group ID to initiate the authentication and security procedure to register the group of UEs to the wireless communications system;
  receive, from the CN node, a registration accept message comprising at least one uplink group Tunnel Endpoint Identifier (TEID) to be used for sending uplink data; and
  transmit, to the CN node, a response comprising at least one downlink group TEID to be used for sending downlink data.

17. The RAN node of claim 16, wherein the memory circuitry storing computer program code which, when run in the processing circuitry, further causes the RAN node to:
  transmit, to a Core Network (CN) node, the received message comprising the group ID to initiate the authentication and security procedure to register the group of UEs to the wireless communications system.

* * * * *